US012530314B2

(12) United States Patent
Leversedge et al.

(10) Patent No.: US 12,530,314 B2
(45) Date of Patent: Jan. 20, 2026

(54) END-TO-END PRODUCT CUSTOMIZATION

(71) Applicant: San Mar Corporation, Issaquah, WA (US)

(72) Inventors: Renton James Leversedge, Mercer Island, WA (US); Jason John Murphy, Riverside, CA (US); Stephen Carl Jacobson, Edmonds, WA (US); Thomas B. Campbell, Covington, WA (US); Adam B. Baldwin, Oviedo, FL (US); Marco Antonio Lopez, Jr., Seattle, WA (US)

(73) Assignee: San Mar Corporation, Issaquah, WA (US)

( * ) Notice: Subject to any disclaimer, the term of this patent is extended or adjusted under 35 U.S.C. 154(b) by 0 days.

(21) Appl. No.: 18/636,137

(22) Filed: Apr. 15, 2024

(65) Prior Publication Data

US 2024/0345991 A1 Oct. 17, 2024

Related U.S. Application Data

(60) Provisional application No. 63/496,165, filed on Apr. 14, 2023.

(51) Int. Cl.
*G06F 16/17* (2019.01)
*G06F 16/11* (2019.01)
(Continued)

(52) U.S. Cl.
CPC ........ *G06F 16/116* (2019.01); *G06F 16/1794* (2019.01); *G06F 16/16* (2019.01)

(58) Field of Classification Search
CPC .... G06F 16/116; G06F 16/1794; G06F 16/16; G06Q 30/0621; G06Q 30/0283; G06Q 30/0643; G06Q 50/04
(Continued)

(56) References Cited

U.S. PATENT DOCUMENTS

| | | | |
|---|---|---|---|
| 7,933,813 | B2 | 4/2011 | Barton |
| 8,271,336 | B2 | 9/2012 | Mikurak |

(Continued)

FOREIGN PATENT DOCUMENTS

| | | |
|---|---|---|
| CN | 109146603 | 1/2019 |
| KR | 20230032020 | 3/2023 |
| WO | 2022182139 | 9/2022 |

OTHER PUBLICATIONS

International Search Report and Written Opinion mailed Aug. 19, 2024, International Application No. PCT/US2024/024687, International Filing Date Apr. 15, 2024.

*Primary Examiner* — Md I Uddin
(74) *Attorney, Agent, or Firm* — Summit Patents, PC

(57) ABSTRACT

The disclosed end-to-end product customization systems and methods receive custom orders from customers or consumers, evaluate them, and generate production-ready custom orders that are able to be used by decorator to create the custom products. The system receives a customization option and an order file type in the custom order. The system or a third party evaluates that customization option to identify a change order that is required and also determines a conversion recommendation to convert the order file type or a production-ready file type. The production-ready custom order is generated based on the change order and the conversion recommendation.

25 Claims, 26 Drawing Sheets

(51) Int. Cl.
*G06F 16/178* (2019.01)
*G06F 16/16* (2019.01)

(58) Field of Classification Search
USPC .. 707/756, 803, 999.102, 999.003, E17.009, 707/E17.005, 688, 737, 769, 770, 802
See application file for complete search history.

(56) References Cited

U.S. PATENT DOCUMENTS

| | | | | |
|---|---|---|---|---|
| 8,489,467 | B2 | 7/2013 | Price | |
| 8,654,120 | B2 | 2/2014 | Beaver | |
| 9,104,298 | B1 | 8/2015 | Varley | |
| 10,740,501 | B2 | 8/2020 | Singh | |
| 11,004,128 | B1 | 5/2021 | Mishra | |
| 2002/0103714 | A1 * | 8/2002 | Eze | G06Q 10/087 705/26.8 |
| 2005/0177453 | A1 * | 8/2005 | Anton | G06Q 10/087 705/26.81 |
| 2013/0132273 | A1 * | 5/2013 | Stiege | G06Q 30/0283 705/41 |
| 2014/0019288 | A1 | 1/2014 | Bossinakis | |
| 2019/0108292 | A1 | 4/2019 | Bowen | |
| 2020/0167850 | A1 * | 5/2020 | Sullivan | G06K 7/1413 |
| 2022/0101421 | A1 | 3/2022 | Siddappa | |
| 2022/0237672 | A1 | 7/2022 | Tang | |
| 2023/0065011 | A1 | 3/2023 | Cook et al. | |
| 2023/0135553 | A1 | 5/2023 | Cella et al. | |

* cited by examiner

800a

800b

800d

END-TO-END PRODUCT CUSTOMIZATION

CROSS-REFERENCE TO RELATED APPLICATIONS

This application claims priority and benefit from the U.S. Provisional Patent Application 63/496,165, filed Apr. 14, 2023, and titled, "END-TO-END PRODUCT CUSTOMIZATION PLATFORM," which is incorporated herein by reference in its entirety for all purposes.

BACKGROUND

Many consumers enjoy customizing products or "articles of manufacture," such as garments, bags, headwear, office supplies, blankets, work gear, safety gear, personal protective equipment, drinkware, other hard goods, and furniture. Customization gives consumers a way to enjoy mass produced articles of manufacture while maintaining a sense of unique tailoring of the products to their needs. Customizing products requires added steps in a supply chain that typically starts with using a "blank" or mass-produced article of manufacture to which a customization is applied. The blank can be an otherwise finished garment or product that is ready for customization. Garment blanks are often manufactured at mass scale by cut-and-sew manufacturers. The customizations vary from applying artwork to a garment by screen printing, direct-to-garment printing, or embroidery, for example, to customizing a fabric cover of a sofa. Such customization tends to require several phases of design that deviate from or add steps to the typical manufacturing process of the blank product. For example, a consumer wishes to customize sweatshirts by placing a company or group logo on it. The blank sweatshirts are manufactured by a typical cut-and-sew manufacturer. The end consumer wishes to customize the sweatshirts with artwork that needs to be assessed by a decorator that will apply the artwork to the blanks sweatshirts to determine if any changes and/or conversions of the artwork are needed to allow it to be applied to the garment in a quality manner. This decorator could be part of the consumer's company team or could be a third-party decorator engaged by the company. Alternatively, multiple people or entities within or external to the company can do the custom order assessment.

After the artwork or other customization option is assessed by the decorator(s), it often needs to be converted to an art file that is able to be used by manufacturing companies known as "manufacturing decorators" with capabilities to apply the artwork to the sweatshirts in this example, or similar blanks, during the customization phase of the manufacturing process. The manufacturing decorators may also do the initial assessment of the artwork files as well or multiple decorators (from the same or different entities) can be involved. These decorators do not cut and sew or similarly assemble the blank products. Rather, they receive manufactured blanks and apply the customization(s) to those blanks. Sometimes, even skilled decorators face complexities in file conversion, which includes converting the file of the artwork or customization option into a production ready file that includes specific instructions on how to manufacture the customized product, such as a production-ready file that includes instructions for the manufacturing equipment that applies the artwork and color of the artwork to the garment or product. In those circumstances, the decorators sometimes engage a conversion house that converts the received artwork file to a production-ready file with machine instructions on how to apply the artwork (location, dimensions, etc.) and the color of the artwork that can be sent to the manufacturing decorator for the selected sweatshirt in this example.

Processing the artwork or other customization options to ensure they can be applied to the selected product in a high-quality manner often takes time, design expertise, and file conversion expertise. In the conventional supply chain, each step of this process is handled by different people or entities and often causes substantial time delays from the date product blanks are ordered to the time when they are ready to be decorated and transformed into customized products. The decorator changes required to create a production-ready file to be able to apply the artwork to the garment blanks, for example, often additionally change the price, typically increasing it, because complexities of the artwork application or the file conversion needed are overlooked during the initial end consumer ordering process.

For example, an end user consumer ("consumer") wishes to embroider a jacket with a team logo. The consumer places an order for the embroidered jacket with a distributor or "customer." The distributor evaluates the order and/or sends the order to a decorator for evaluation. In this example, the decorator determines that the stitch count of the initial order the consumer placed with the customer needs to be increased by 30% to output a quality end product based on the artwork design and the selected jacket. Further, the artwork file was not compatible with the manufacturing equipment designed to embroider the jacket with the team logo and needed to be sent to a conversion house to create a production-ready file. The price correspondingly increases based on the additional stitch count required and the file conversion work by the conversion house and the order processing is delayed because of this extra work. Oftentimes, to secure the order, the customer has already committed to the consumer to produce the customized embroidered jackets at a price that does not include the extra work related to the higher stitch count and the file conversion. Even worse, it may be determined that the artwork provided is not of a form or quality sufficient to manufacture the ordered jackets at all.

In some relationships, the consumers custom order the custom products through an advertisement specialty company that applies the logo or customization(s) through a third party, such as a screen printer or another company that separately contracts the printing or decoration of the product, which further complicates the customization process. The time delay to receive this accurate pricing information and the supply chain complexity would likely result in a lost opportunity to do business with many consumers. The conventional system leaves pricing uncertainty to instead be absorbed by the consumers or customers, which can occur a lengthy period of time after the order is placed and increases costs in unexpected ways. Generalized supply chain complexity of the conventional systems results in substantial frustrations to many consumers and customers.

Further, many entities or individuals are handling different phases of the product customization process, which leads to a disjointed, inefficient, and frustrating supply chain to customize products. Consumers become discouraged by the process and its challenges even when they are interested in customized products, resulting in many consumers avoiding customizing products because of these issues. Likewise, customers, such as distributors, grow frustrated with the inefficiencies and/or price and quality uncertainty of the customization process because they have the direct relationship with the consumer and are accountable to them for changes in price and processing delays.

Therefore, the art could benefit from an improved system that reduces the complexity of and consolidates the product customization process into a streamlined process that improves supply chain management, order tracking, pricing uncertainties, and transparency throughout the customization process.

BRIEF DESCRIPTION OF THE DRAWINGS

Non-limiting and non-exhaustive embodiments of the invention are described with reference to the following drawings. In the drawings, like reference numerals refer to like parts throughout the various figures, unless otherwise specified, wherein.

DETAILED DESCRIPTION

The disclosed end-to-end product customization systems and methods are designed to streamline a conventionally disjointed and complex product customization supply chain, improve pricing accuracy and product quality, and reduce time delays. The conventional supply chain to customize products is inefficient, has time delays and uncertainty, and is often wrought with challenges and complexities at various stages because of excessive and inefficient coordination required between multiple, distinct entities with non-uniform data, instructions, and processes. The disclosed end-to-end product customization systems and methods offer visibility into each phase of the product customization process using a centralized system/server/device with which any individual or entity along the product customization supply chain can interact. This process visibility and centralized system offers consumers and all entities along the product customization supply chain improved efficiencies, pricing, timing, and overall user experience. The customized products created by the disclosed end-to-end product customization system can include garments and soft goods, hard goods (e.g., coolers, drinkware, etc.), uniforms (teams, companies, schools, or the like), furniture, and the like. The examples disclosed in this application focus on garments and other products although a person of skill in the art will understand that the disclosed end-to-end customized product system includes customizing other products, such as all hard goods, furniture, and the like. The disclosed end-to-end product customization system can customize any product that can potentially be transformed or altered for production at scale. The end-to-end product customization system also provides improved order tracking, pricing, production progress and time estimates, etc. throughout the customization process because each entity in the supply chain is transmitting data to and from the centralized system and can access such progress data at any time.

Figure 1A:
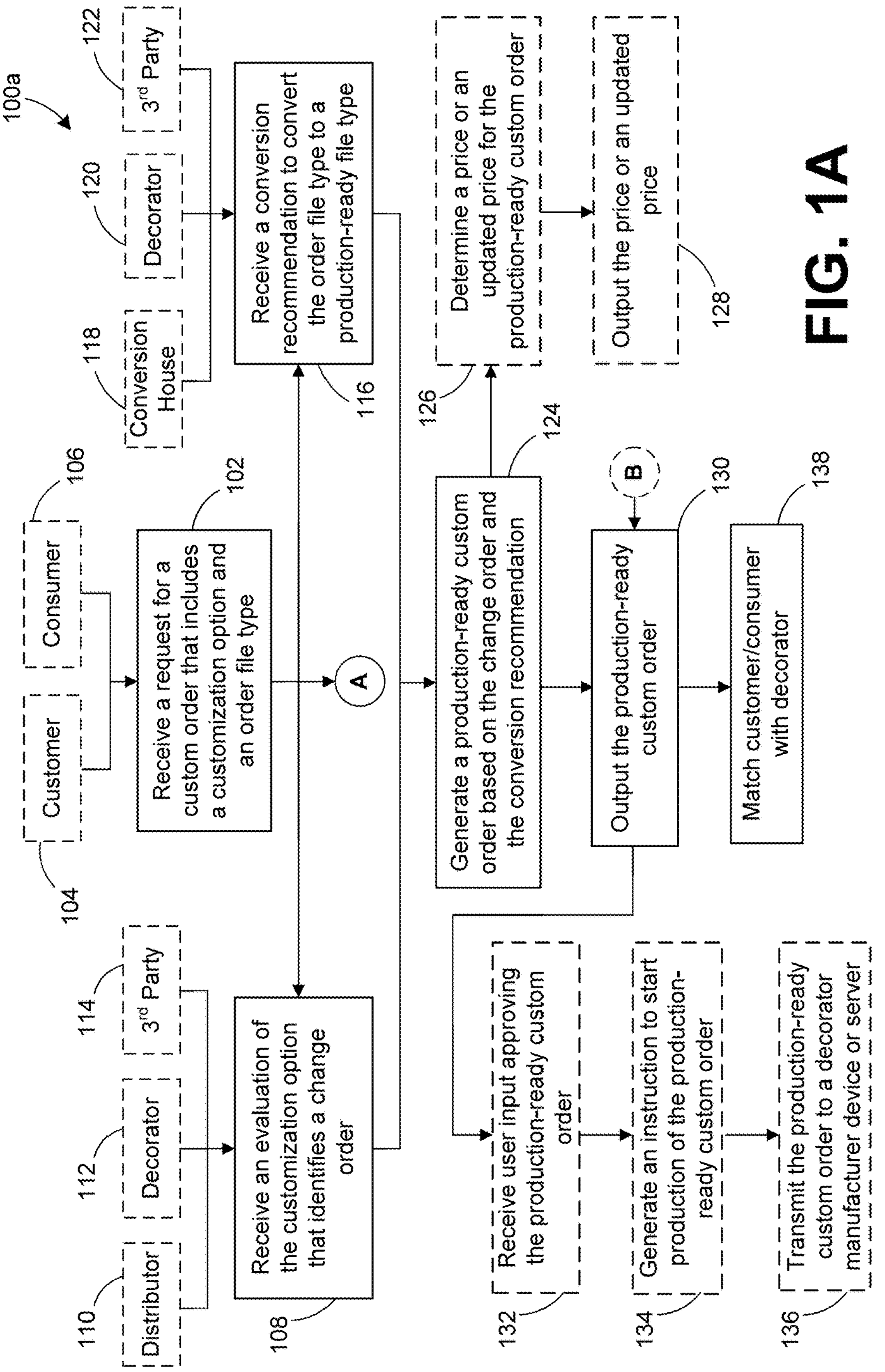
FIGS. 1A-1B is a process flow diagram of an exemplary end-to-end product customization process.
Figure 1B:
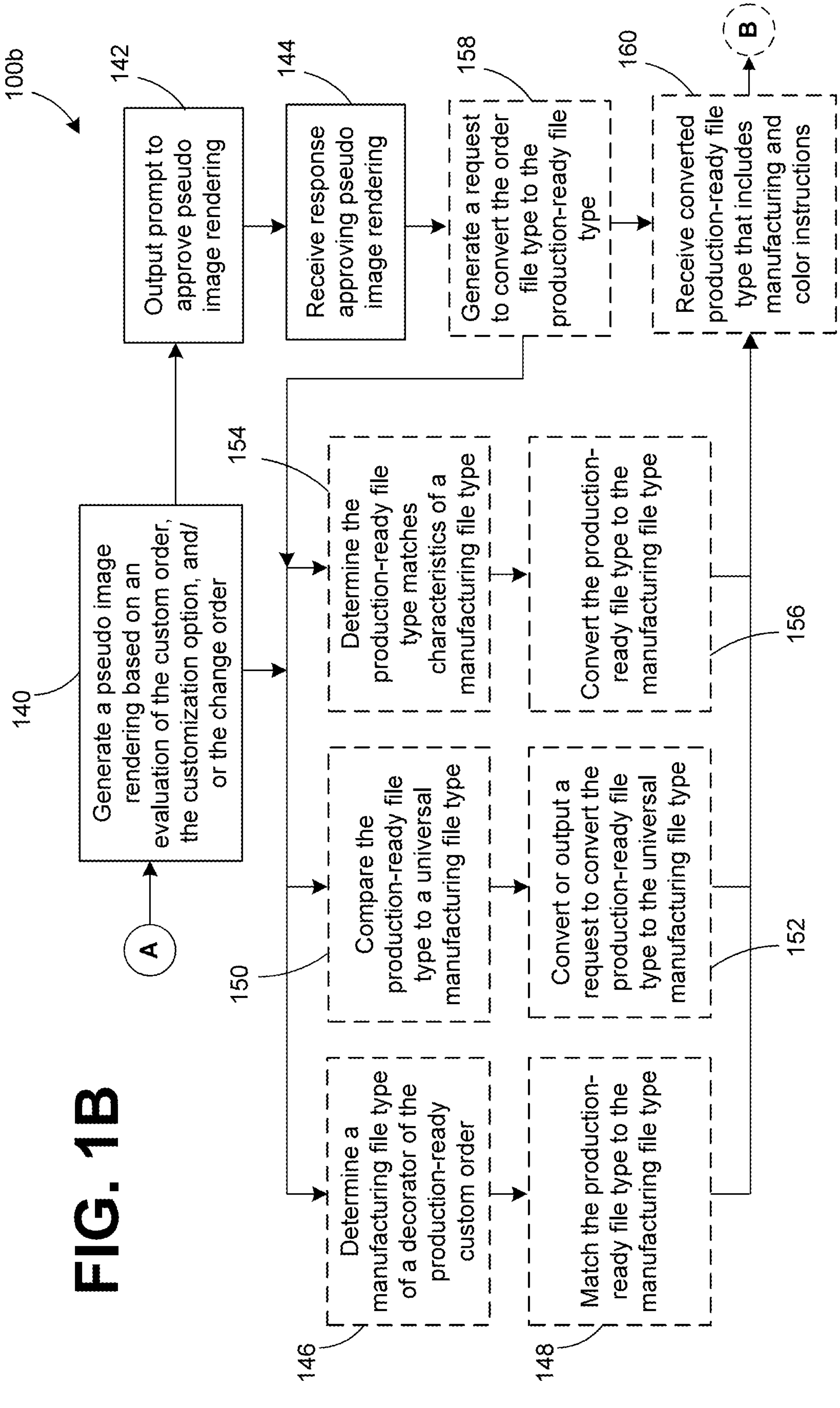

FIGS. 1A and 1B show example end-to-end product customization processes 100*a*, 100*b*. The end-to-end product customization system receives a request for a custom order 102 from a customer 104, such as a distributor; or consumer 106, some combination, or the like. The custom order includes a customization option and an order file type. The customization option is one or more aspects, features, colors, characteristics, etc. that the customer/consumer can select to customize the product and can be either selected from a library of customization options that the end-to-end product customization provides or from a file provided by the customer/consumer. In some examples, the customization option is artwork to be added or applied to a product, but the customization options can also include, but are not limited to, specialty instructions for etching, carving, finishes, components, sizing, and features. The order file type is the digital file type in which the customization option is stored and submitted for ingestion into the end-to-end product customization system 100*a*.

The end-to-end product customization system 100*a* also receives an evaluation of the customization option 108. The evaluation of the customization option can be done by any one or multiple entities, such as a customer or distributor 110, a decorator 112, or a third party evaluator 114. In some examples, multiple parties evaluate the customization option. The evaluation includes reviewing the customization option to ensure the proposed customized product will meet a quality standard and/or to determine of whether the customization option requires modification, such as a file conversion, or manufacturing instruction change, such as changing an aspect of how the customization option is applied to the selected product (e.g., increasing stitch count for embroidered jackets).

In some examples, the customization option requires no changes, which means that the file type can be sent to a decorator manufacturer to process the custom order and the customization option quality meets or exceeds a set standard. The decorator manufacturer typically requires a specific file type to process the customized order, such as a required file type for the equipment used to customize the garments and/or a format for the instructions used to process the order at the decorator manufacturer. The standard set for the order quality can include a minimum quality standard of the proposed customized product, set by the decorator manufacturer, the customer/distributor, an industry standard, or the like, or a combination of any applied quality standards.

In other examples, the evaluators 110, 112, 114 of the customization option determine that the customization option requires a change order before progressing the order to the decorator manufacturer. A change order is a change the evaluator recommends or determines is required to process the order to the decorator manufacturer. Such change orders can include a file conversion, quality adjustment, instruction to change a feature or characteristic of the customization option, etc. or a combination of any multiple options for the change order.

The end-to-end product customization system 100*a* can also receive a conversion recommendation 116. A conversion recommendation is a recommendation or requirement to convert the order file type to a file type that is compatible with the equipment used to manufacture the customized products. In some examples, a evaluator determines that no file conversion is required because the order file type is compatible with the equipment used by the decorator manufacturer to produce the customized products. The order file type is compatible with the decorator manufacturer equipment when it includes all instructions necessary for the decorator manufacturer and its equipment to produce the customized products. Such instructions include, but are not limited to placement and layout of the customization option on the product, color details for the customization option, equipment specific instructions, etc.

In the example shown in FIG. 1A, the end-to-end product customization system 100*a* receives a conversion recommendation to convert the order file type to a production-ready file type 116. The production-ready file type is a file type compatible with and including all instructions to send to a decorator manufacturer to produce the customized products. The end-to-end product customization system 100*a* receives the conversion recommendation from any entity that evaluates the custom order to determine whether the order file type needs to or is recommended to be converted to a production-ready file type. Such entities evaluating the file type of the custom order include a conversion house 118, a decorator 120, and/or any other third party file type evaluator 122 or a combination of evaluators. A conversion house 118 is an entity that performs the file conversion from an order file type to a production-ready file type. Typically, a file conversion requires the expertise of a conversion house 118 when the file conversion is complex, detailed, labor-intensive, and/or includes unique conversion requirements. In other circumstances, a conversion house 118 converts the order file to the production-ready file type because the decorator 120 does not have the expertise or bandwidth to perform the necessary file conversion. In FIG. 1A, the conversion house 118 is shown as a separate entity from the end-to-end product customization system 100*a* although the conversion house 118 can be a sub-component of a decorator 120 and/or the end-to-end product customization system 100*a* in some other examples.

In the example shown in FIG. 1A, the evaluation of the custom order occurs with entities that are shown to be discrete from or remote from the end-to-end product customization system 100*a*. In other examples, the evaluation of the custom order or a portion of the evaluation occurs in a module of the end-to-end product customization system 100*a* itself. File type evaluation—regardless of which entity or entities perform it—includes determining whether the order file type is compatible with the file type required by a decorator manufacturer to produce the customized product. Decorators of the same type of customization option can have the same file type requirements or they can differ, depending on many factors including the file type, the customization option, internal processes of a decorator, and the like. File type conversion and change orders can be performed by an evaluator and/or a module in the end-to-end product customization system 100*a* either or both of before and after a specific decorator is matched to a custom order. The same or different decorator(s) can evaluate the custom order than the decorator that is selected to produce the custom order, in some examples.

The end-to-end product customization system 100*a* generates a production-ready custom order based on the change order and the conversion recommendation it receives 124. In alternative examples, the end-to-end product customization system 100*a* generates one or both of the change order and the conversion recommendation. In some examples, the order file type is a production-ready file type, in which case the order file does is not converted. When the end-to-end product customization system 100*a* generates the production-ready customization order, it can also produce a price for the production-ready custom order 126, which is based on the change order and the conversion recommendation. Because of the end-to-end product customization system 100*a* determines the price based on the change order and conversion recommendation, the price is accurate and not subject to a high risk of price fluctuations as the custom order progresses through the supply chain, which increases certainty and transparency for the customer. The end-to-end product customization system 100*a* can calculate the price multiple times, particularly if the system 100*a* receives and/or generates the change order and the conversion recommendation at different times or multiple times throughout the evaluation of the custom order. If the price is determined multiple times, the later-determined prices are calculated as an updated price for the custom order, as needed. In some examples, the end-to-end product customization system 100*a* outputs the price or the updated price 128 to any one or multiple entities in the supply chain for the custom order and/or to a display or dashboard specific to any entity in the supply chain.

After the end-to-end product customization system 100*a* generates the custom order 124, it can output the production-ready custom order 130 to any entity in the supply chain, and/or to a display or dashboard specific to any entity in the supply chain. Additionally or alternatively, the end-to-end product customization system 100*a* outputs the production-ready custom order 130 to a customer for approval. The customer can send feedback and/or requested changes to the custom order, as needed. When the customer is satisfied with the production-ready custom order, they output/transmit/send approval of the custom order to the end-to-end product customization system 100*a*. The end-to-end product customization system 100*a* receives the user input approving the production-ready custom order, which in the example shown in FIG. 1A is the customer/distributor approving the production-ready custom order, and generates an instruction to start production of the production-ready custom order 134. The system 100*a* then transmits this instruction to start production of the production-ready custom order to a decorator manufacturer 136 or other system/server/device that instructs the decorator manufacturer 136.

The end-to-end product customization system 100*a* matches the customer or consumer with a decorator 138 after it receives a request for a custom order. A match occurs when the end-to-end product customization system 100*b* identifies and/or approves a decorator that will fulfill the custom order for the customer. The customer may or may not have worked with the matched decorator on a past order, and the end-to-end product customization system may or may not give the customer the ability to approve/reject the match. The end-to-end product customization system can also send a prompt to the decorator to accept/reject the custom order in some examples or can commit the decorator based on the decorator's provided availability or decorator profile in other examples. The end-to-end product customization system 100*b* determines a match between a customer and a decorator, for example, based on predetermined criteria, such as decorator availability and decoration expertise or capabilities, customer and/or decorator geographic location, customer order history, customer and/or decorator preferences, feedback about the customer and/or decorator from previous engagement with the end-to-end product customization system, customer and/or decorator profile characteristics and/or features, etc.

FIG. 1B shows another portion 100*b* of the end-to-end product customization system 100*a* that is shown in FIG. 1A. In this portion of the end-to-end product customization system 100*b*, the end-to-end product customization system 100*b* generates a pseudo image rendering of the custom product. In examples in which the custom order includes no change order or conversion recommendation, the pseudo image rendering is based on the custom order itself and its file type. In other examples, the pseudo image rendering is based on an evaluation of the custom order, the customization option, and/or the change order 140. The end-to-end product customization option evaluates the custom order for details regarding the customization option, such as the type of customization, features and characteristics of the customization, placement and/or location of the customization option on the product, etc. This evaluation can be the same as or additional or different analysis to the evaluation of the custom order that is performed to generate a change order and/or the conversion recommendation for the production-ready custom order that is shown in FIG. 1A.

In an example, the generated pseudo image rendering is based on an evaluation of the custom order that includes more detail than the evaluation of the custom order to determine if a change order and/or conversion recommendation are required or recommended. This evaluation embodiment produces a generated pseudo image with details about the customization option that are not required for the evaluation to determine a change order or conversion recommendation. For example, the evaluation of the custom order to produce the pseudo image rendering includes a determination of a stitch count of a custom order for an embroidered jacket. The stitch count meets or exceeds the threshold quality level and therefore does not require a change order. However, the end-to-end product customization system 100*b* determines such a stitch count to be able to create an image rendering that depicts the proper stitch count in detail on an image of the jacket or on a model or avatar depicted wearing the jacket. This displayed image rendering of the proper stich count on the jacket, regardless of how it is depicted, is used to generate the pseudo image. Alternatively, another aspect or multiple aspects of the custom order are used to generate the pseudo image, such as but not limited to color, shading, placement and/or location of the customization option, and the like.

A pseudo image rendering includes visual features that depict one or more details of the custom order. In an example, the visual features depicted in the pseudo image rendering are mapped to a product along predetermined contours or pathways that extend over the entire product or a portion of the product to which the customization option is applied. In some examples, this mapping of the customization option, such as customer-supplied artwork, to a product, such as a garment, requires the artwork to be adjusted to depict how the perspective, angles, contour, textile texture, or the like of the artwork would appear on a garment blank. Some products have specific locations spaced apart from one another that are used as anchor points for the customization option, like artwork, to be applied to the product. The artwork is virtually attached at multiple anchor points on the product to create a life-like pseudo image rendering of the artwork applied to the product, in this example. It is this mapping or "matching" of the artwork or other customization option to the product and generating of a pseudo image rendering that provides the customer with a life-like sample from which to request changes or approve for further processing. Some conventional systems overlay an image of the customization option on an image of the product to produce a virtual image of the combined customization option on the product. These systems perform no mapping of the customization option to the product nor do they depict an image with specific perspective, angles, contour, textile texture, or the like of the artwork as it would appear on a garment blank. Instead, they are flat images without a mapped or matched contour or other perspective to the product, which makes it difficult for customers and consumers to visualize the customized blank.

Mapped artwork to products provide a pseudo image that shows how the artwork will appear on a real product. The mapped artwork tracks with the contour, shape, flexibility, and the like of the garment or other product to simulate movement or a manner in which the product will be used, such as a how a garment fits a live model. For example, when a human wears a jacket, the torso and arms of the jacket expand and have a curvature. Artwork applied to the jacket will also expand and have a curvature in a similar manner and will not lay flat on the jacket as it moves. The disclosed system provides the life-like visualization of the jacket as it is worn by a human so they can approve the order or request changes while the conventional systems of overlaying artwork to the jacket would not show the same curvature. In this example, the artwork may deform when a human wears it because of one or more aspects of the customization option, such as the stitch count for an embroidered jacket. The life-like visualization of the embroidered jacket would display deficient stitch count in this example while the overlaid version of conventional systems would not.

In the conventional systems, the decorator creates a proof of the customized product (e.g., a single garment with the applied artwork) with the customization option for approval by the customer. The proof is sent to the customer, who either approves it or requests changes. This process requires time and often increases the cost of the custom order. In the disclosed systems, the pseudo image rendering helps eliminate the need for the lengthy and expensive proof approval process employed in the conventional systems because of its life-like visualization by the disclosed systems. The customer can request changes by submitting a change order to the end-to-end product customization system 100*b*, which are then depicted in an updated pseudo image rendering that reflects the changes. This change order process can repeat until the customer approves the pseudo image rendering. Any requested changes cause the end-to-end product customization system 100*a* to update the price, as shown in FIG. 1A. The customer controls the approval of the custom order (cf. a decorator creating and shipping a sample proof to the customer) and has an accurate, real-time price for the custom order.

The end-to-end product customization system 100*b* can output a prompt to the customer or another user to approve the pseudo image rendering 142. As discussed above, the end-to-end product customization system 100*b* can interact with a user, such as a customer, one or multiple times to edit or adjust various aspect(s) or features of the custom order that is depicted in the pseudo image rendering, which generates updated pseudo image renderings, as needed. When the customer is satisfied with the pseudo image rendering, they send a response approving the pseudo image rendering 144 to the end-to-end product customization system 100*b*.

In parallel or series to this approval process with the customer, the end-to-end product customization system 100*b* or a third party (e.g., a decorator and/or conversion house) converts the file. The end-to-end product customization system 100*b*, conversion house, or decorator generates a request to convert the order file type to the production-ready file type 158 or the end-to-end product customization system 100*b*, conversion house, or decorator proceeds to evaluate the file type it/themselves. In one embodiment, the end-to-end product customization system 100*b*, conversion house, or decorator determines a manufacturing file type of one or more decorator(s) matched to or identified as possible matches for the production-ready custom order 146 then matches the production-ready file type to the manufacturing file type required by the one or more decorator(s) 148. In another embodiment, the end-to-end product customization system 100*b*, conversion house, or decorator compares the production-ready file type to a universal manufacturing file type used for the selected customization option or the decorator(s) identified for the custom order 150 then convert or outputs a request to convert the production-ready file to the universal manufacturing file type 152. In yet another example, the end-to-end product customization system 100*b*, conversion house, or decorator determines the production-ready file type matches one or more characteristics of a manufacturing file type 154 and converts the production-ready file type to the manufacturing file type 156.

Regardless of how it is generated, the end-to-end product customization system 100*b* receives the converted image production-ready file type, which includes the manufacturing and color instructions 160. The manufacturing instructions includes details specific to the equipment and/or decorator manufacturing the customized products. For example, the manufacturing instructions include equipment settings and features to employ, artwork placement and location, processing requirements, and the like. The color instructions can include specific colors, such as pantone and intensity values for one or more portions of the customized product. Manufacturing instructions can also include packaging and/or product care requirements, recommendations, or requests. For example, the cut-and-sew manufacturer of the blank product recommends screen printing artwork to a garment within a specific temperature range or using a needle size specific to the textile used in the garment, which are included in the manufacturing instructions. In another example, a customer requests that the finished customized products are individually packaged before being shipped, which is also included in the manufacturing instructions for the decorator.

Figure 2:
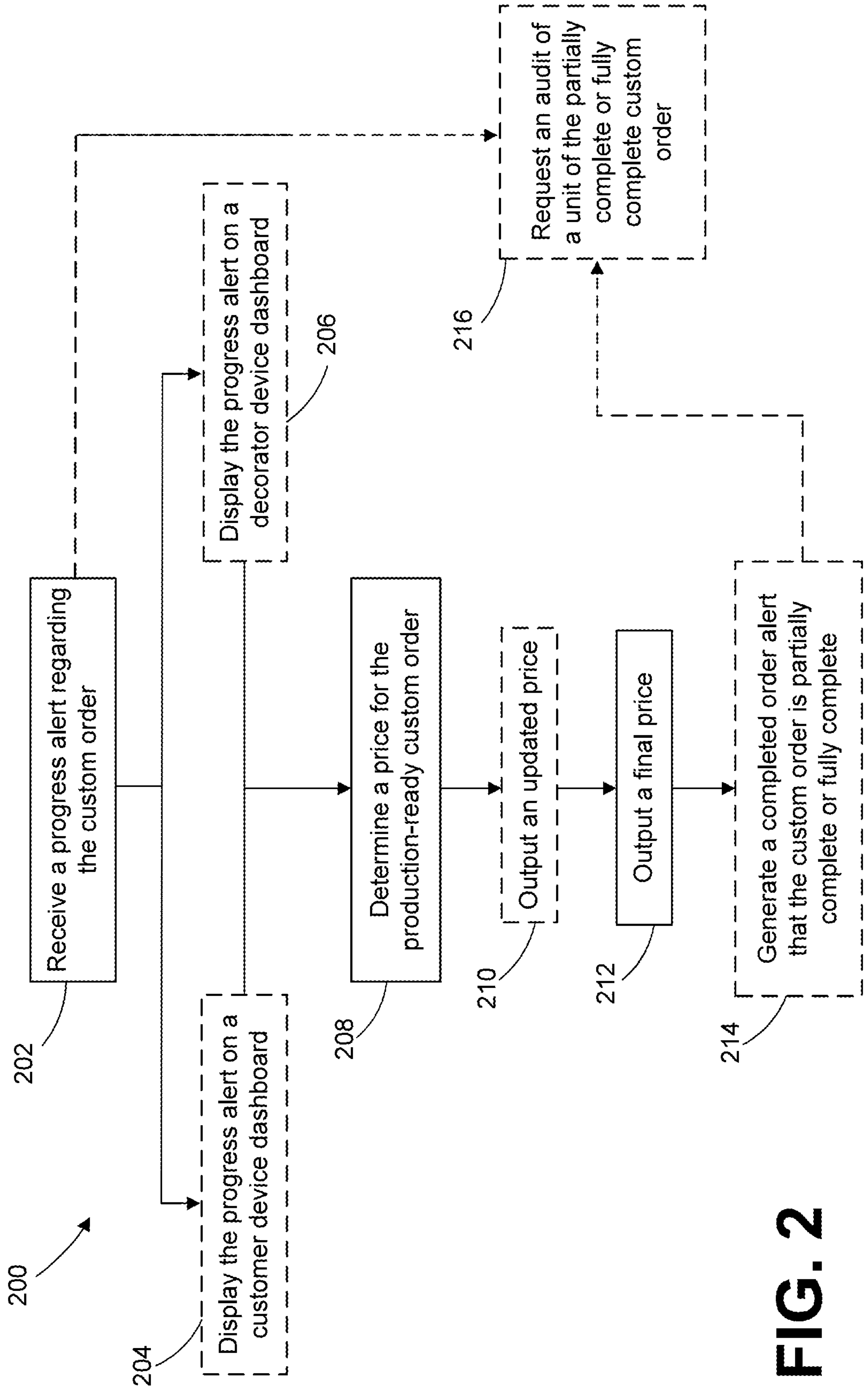
FIG. 2 is a process flow diagram of another portion of an exemplary end-to-end production customization process.

FIG. 2 shows a portion of an example end-to-end product customization system 200 with alerts, price updates, and audit requests. The end-to-end product customization system 200 receives a progress alert regarding the custom order 202. The progress alert is a data package or message with any information relating to a status of one or more phases of a process to create a custom order. For example, progress alerts include messages indicating the start or completion of a phase of the process to create the custom order or an estimated start or completion time for a phase of the process. Such alerts can be output to any device/system/server. In the example shown in FIG. 2, the alerts are output to a display for a customer device dashboard 204 and a display for a decorator device dashboard 206. Alternatively or additionally, alerts can be automatically or manually transmitted or sent via a push notification, or the like, to any remote user devices and/or systems/devices/servers.

As discussed above in regard to FIGS. 1A and 1B, the end-to-end product customization system 200 determines a price for the production-ready custom order 206. The price is a real-time price based on the received custom order, the customization option, and/or the conversion recommendation. The price dynamically changes in real-time or is manually updated to change when a change order and/or conversion recommendation occurs in the end-to-end product customization system 200. If a custom order requires multiple iterations of changes and/or conversion recommendations, the price may be updated one or more times 210, depending on the circumstances. When the change orders and conversion recommendations are finalized, the end-to-end product customization system 200 creates, then outputs the final price of the custom order 212.

In the example shown in FIG. 2, the end-to-end product customization system 200 generates a completed order alert when the custom order is partially or fully complete 214. Such a completed order alert can be output to any user device/system/server connected to the end-to-end product customization system 200. Additionally, the end-to-end product customization system 200 generates a request for an audit of a unit of the partially complete or fully complete custom order 216. An audit includes a quality inspection or review of a single or small volume of sample customized products that are considered completed and ready to send to the customer. The quality inspection occurs in multiple ways with physical inspection by a human or inspection by equipment such as an optical imager, live video feed, or the like that are analyzed by either a human reviewer or an image processing algorithm, for example. Other quality controls can be included in the audit, if desired.

Figure 3:
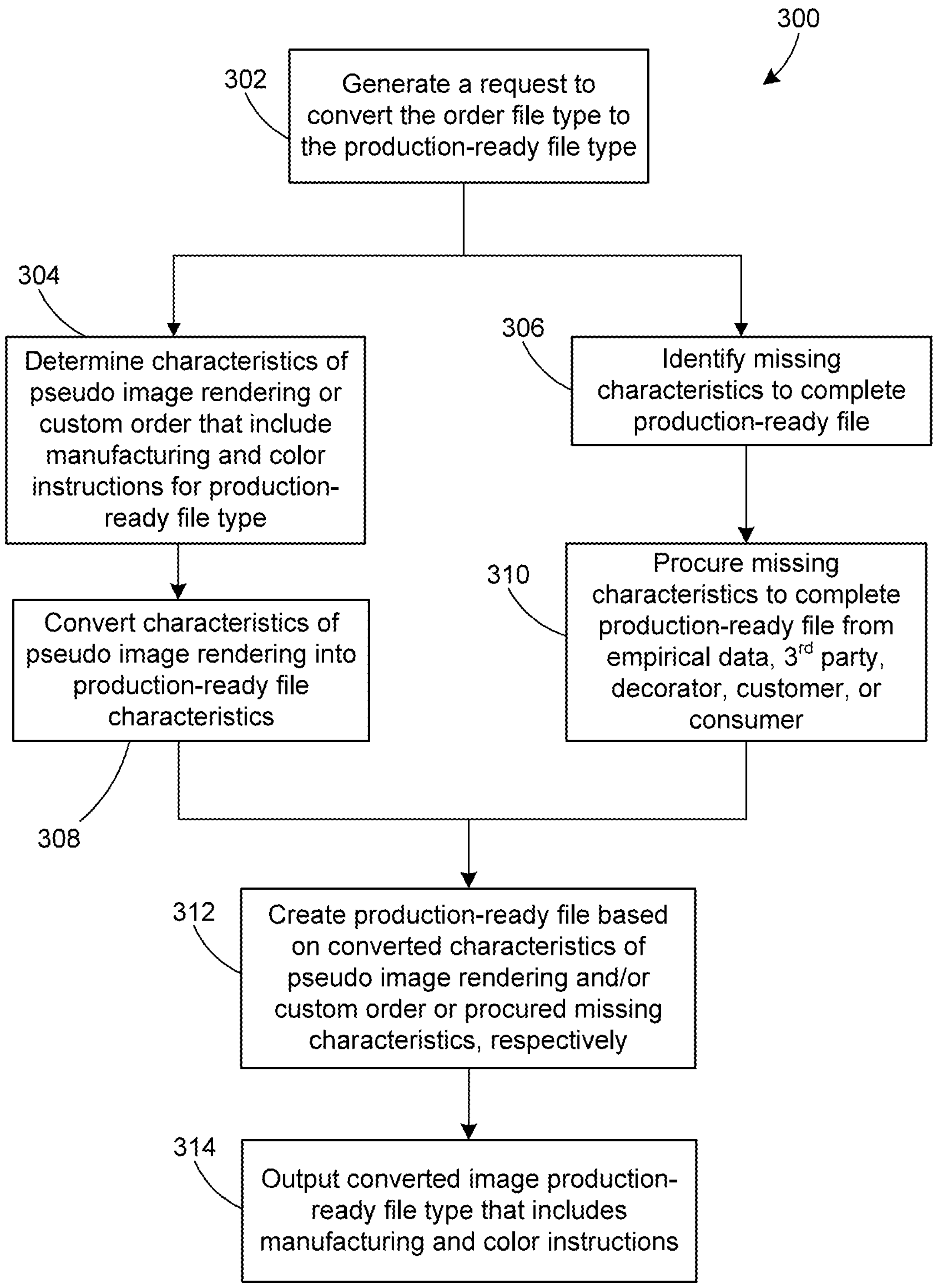
FIG. 3 is a process flow diagram of an exemplary file conversion process.

FIG. 3 shows an example file conversion process 300 that can be included in the disclosed end-to-end product customization systems. The file conversion process to convert an order file into a production-ready file type is complex and expensive because it often requires a human to analyze the order file and to manually create the production-ready file. The example file conversion process 300 disclosed here can be performed by a conversion module that determines characteristics of the custom order from the order itself and/or from a pseudo image rendering that include manufacturing and color instructions (or other manufacturing instructions) for a production-ready file type. Such an analysis of production-ready file type(s) for specific customization options can be performed before or after receipt of the custom order. For example, after the custom order is received, the example file conversion process 300, which can be part of or a separate module from the end-to-end product customization system, can generate a request to convert the order file type to the production-ready file type 302. The file conversion process 300 generates this request based on the custom order, the order file type, and/or the production-ready file type. The file conversion process 300 can determine characteristics of a the custom order and/or the pseudo image rendering that includes manufacturing and color instructions for the production-ready file type 304 and/or can identify missing characteristics to complete the production-ready file 306. When determining characteristics of the pseudo image rendering or the custom order that includes manufacturing and color instructions for the production-ready file type, the file conversion process 300 evaluates and extracts a fixed set of criteria, characteristics, and/or features from the pseudo image rendering and/or the custom order that are required for the production-ready file type. This fixed set of criteria, characteristics, and/or features extracted by the file conversion process 200 are then converted into the production-ready file characteristics, such as by ordering, reformatting, converting, translating, or otherwise manipulating the fixed set into the data required by the production-ready file characteristics 308.

During the file conversion in which the file conversion process 300 identifies missing characteristics, the system can also procure the missing characteristics to complete the production-ready file 310. These procured missing characteristics can be sourced from empirical data, $3^{rd}$ party data, the decorator's profile or a response the decorator sends to a prompt or inquiry, the customer's profile or a response the customer sends to a prompt or inquiry, or the consumer's profile or a response the consumer sends to a prompt or inquiry. Any suitable source can be used to procure the missing characteristics of the production-ready file 310. If the file conversion process 300 is unable to procure all missing characteristics, it can generate an alert or prompt notifying a user of the missing characteristics, such as the decorator, a conversion house, a human user from another $3^{rd}$ party of the like.

The file conversion process 300 creates the production-ready file based on the converted characteristics of the pseudo image rendering, the custom order, and/or the procured missing characteristics, respectively 312. This converted image includes manufacturing and color instructions and can be output to any entity in the supply chain or third party 314.

FIGS. 4A-4E show example computer systems of the centralized end-to-end product customization system/server/device 400 and various remote systems/servers/devices that interact with it. The end-to-end product customization system 400 includes memory, multiple modules 402, input/output devices 426, communications 428, memory devices 430, and physical processors 432. The memory 421 stores various libraries, files, profiles, datasets, and the like that the end-to-end product customization system 400 uses, generates, and/or ingests from a user. Such data is stored for later use by individual users of the system 400 or by modules, routines, system AI/ML models, or for any other reason. The end-to-end product customization system 400 may represent a server or other form of computing or data processing system, system, or device. Modules 402 each contain a set of computer executable instructions that, when the set of instructions is executed by a suitable electronic processor or processors (such as that indicated in the figure by "Physical Processor(s) 430"), the system (or server, system, or device) 400 operates to perform a specific process, operation, function, or method. Modules 402 are stored in a memory 421, which typically includes an operating system module 404 that contains instructions used (among other functions) to access and control the execution of the instructions contained in other modules. The modules 402 stored in memory 421 are accessed for purposes of transferring data and executing instructions by use of a "bus" or communications line 419, which also serves to permit processor(s) 430 to communicate with the modules for purposes of accessing and executing a set of instructions. Bus or communications line 419 also permits processor(s) 430 to interact with other elements of system 400, such as input or output devices 426, communications elements 428 for exchanging data and information with devices external to system 400, and additional memory devices 430.

For example, module 406 may contain computer-executable instructions which when executed by a programmed processor cause the processor or a device containing the processor to perform the functions of a client application to enable the ingestion and transmission of data either on the system/device/server 400 or (as an example) to navigate to a server, upload data to the server, and present the output(s) to a user (e.g., in the form of a display, such as a user dashboard, etc.). Modules 402 may contain computer-executable instructions which when executed by a programmed processor cause the processor or a device containing the processor to generate a user interface for presentation to a user, such as a web application or dashboard for a user. The interface may provide the user with tools and instructions for interacting with the end-to-end product customization system/server/device 400 in some examples. The system/server/device 400 shown in FIG. 4 includes multiple modules 402.

The functionality for data acquisition, data processing, data ingestion, etc. may be provided to a user in one or more formats, such as a "user" user interface (user UI) 408. These include a software development kit (SDK), for example, that developers can use to perform one or more of the functions (such as data collection, initial data processing, file conversion, change order identification, running AI/ML models) in their own applications. In another embodiment, a downloaded client application is provided that is capable of performing one or more of the functions directly to a user. In another embodiment, certain functions of the client application may be replaced by services accessible through an account on a Software-as-a-Service (SaaS) system.

In any of these embodiments, the trained models may reside as services on a remote server or system so that the models can be updated and continually trained and improved as new data becomes available. This arrangement may allow data collected from multiple users to be made available to determine correlations between decorator-customer matches, custom order evaluations, conversion recommendations, order progress, and pricing, for example. In any of these embodiments, the interface may be provided through the web, mobile, or desktop.

Modules 402 may each contain computer-executable instructions which when executed by a programmed processor cause the processor or a device containing the processor to ingest, evaluate, transmit, generate instructions for, update, or otherwise process various data received and/or transmitted to/from the end-to-end product customization system/server/device 400. Module 410 may contain computer executable instructions which when executed by a programmed processor or a device containing the processor to evaluate the custom order for the customization option and an identified change order, such as the examples discussed above. Module 416 may contain computer executable instructions which when executed by a programmed processor or a device containing the processor generate a conversion recommendation that converts the order file type 419 to a production-ready file type 420, such as the examples discussed above.

Module 418 may contain computer executable instructions which when executed by a programmed processor or a device containing the processor match a decorator with a custom order or a customer and/or to match available profiles of a decorator or decorators to a customer profile(s). Module 420 may contain computer executable instructions which when executed by a programmed processor or a device containing the processor track the progress of a custom order. Module 422 may contain computer executable instructions which when executed by a programmed processor or a device containing the processor determine an accurate, and optionally real-time price or updated price of the custom order.

In some embodiments, certain of the functionality and services provided by the system and methods described herein may be made available to multiple users by accessing an account maintained by a server or system. Such a server or system may be termed a form of SaaS. It should be understood that the disclosed embodiments can be implemented in the form of control logic using computer software in a modular or integrated manner. Based on the disclosure and teachings provided herein, a person of ordinary skill in the art will know and appreciate other ways and/or methods to implement the embodiments using hardware and a combination of hardware and software.

In some embodiments, certain of the methods, models, or functions described herein may be embodied in the form of a trained neural network, where the network is implemented by the execution of a set of computer-executable instructions or representation of a data structure. The instructions may be stored in (or on) a non-transitory computer-readable medium and executed by a programmed processor or processing element. The set of instructions may be conveyed to a user through a transfer of instructions or an application that executes a set of instructions (such as over a network, e.g., the Internet). The set of instructions or an application may be accessed by a user through a SaaS system or a service provided through such a system. A trained neural network, trained AI/ML model, or other form of decision or classification process may be used to implement one or more of the methods, functions, processes, or operations described herein. Note that a neural network or deep learning model may be characterized in the form of a data structure in which are stored data representing a set of layers containing nodes, and connections between nodes in different layers are created (or formed) that operate on an input to provide a decision or value as an output.

Many aspects of the disclosed systems may include a machine learning model that helps evaluate ingested data for a particular purpose based on a characteristic, factor, rule, and/or environmental assumption(s), for example. Machine learning (ML) is used to enable the analysis of data and assist in making decisions in multiple industries. In order to benefit from using machine learning, a machine learning algorithm is applied to a set of training data and labels to generate a "model" which represents what the application of the algorithm has "learned" from the training data. Each element (or example, in the form of one or more parameters, variables, characteristics or "features") of the set of training data is associated with a label or annotation that defines how the element should be classified by the trained model. An ML model is a set of layers of connected neurons that operate to make a decision (such as a classification) regarding a sample of input data. When trained (i.e., the weights connecting neurons have converged and become stable or within an acceptable amount of variation), the model will operate on a new element of input data to generate the correct label or classification as an output. Several components, modules, and portions of the disclosed end-to-end product customization system benefit from including an ML model for data analysis, such as content moderation.

Figure 4A:
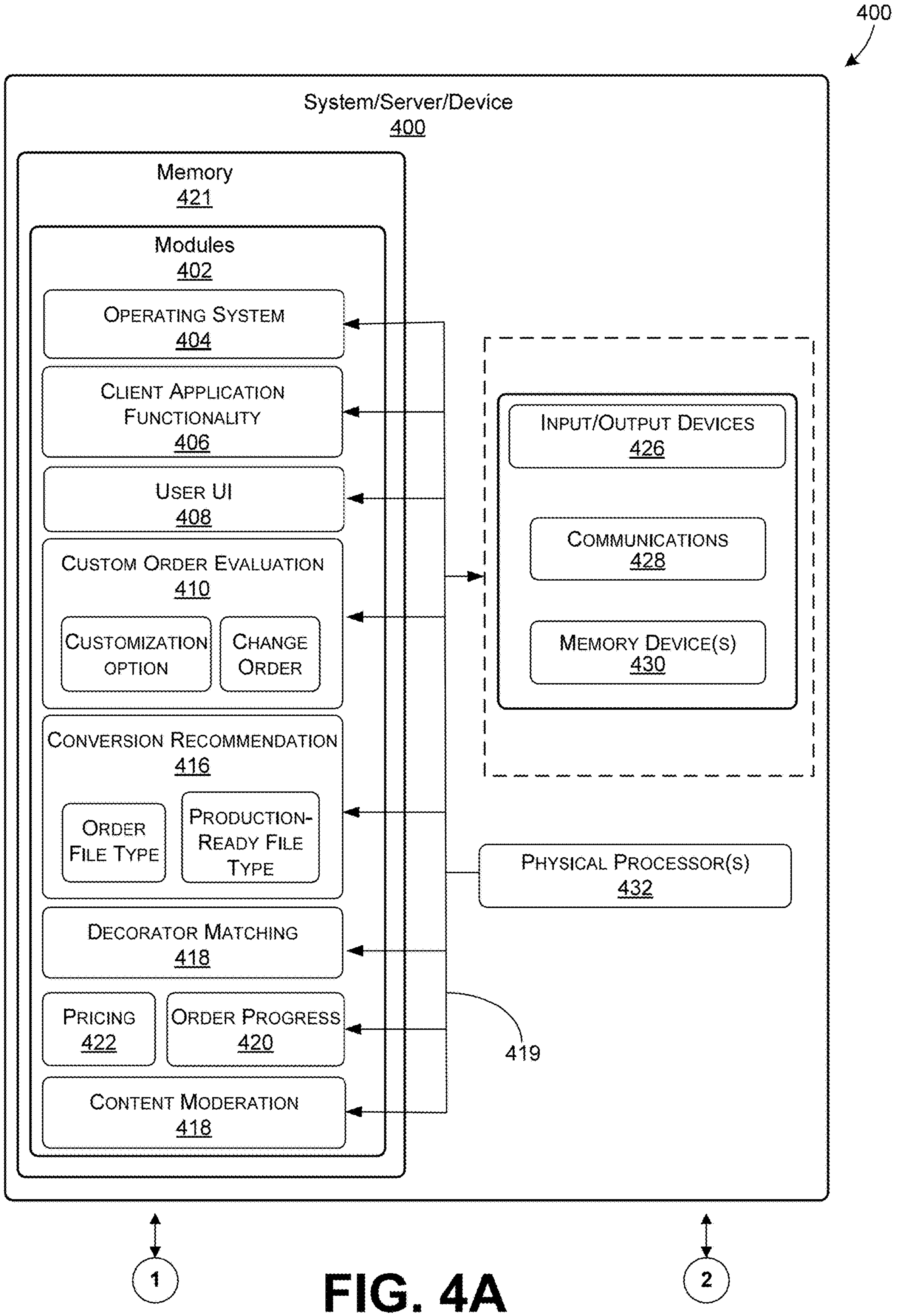
FIGS. 4A-4E show example computer systems of the centralized end-to-end product customization system/server/device.

For example, the content moderation module 418 shown in FIG. 4A may contain computer executable instructions which when executed by a programmed processor or a device containing the processor can be an image processing algorithm that identifies certain image characteristics that do not meet the standard for the end-to-end product customization system. An AI/ML model for content moderation is first trained on a dataset of prohibited content, such as known brands, logo, taglines, inappropriate or suggestive words, illicit content, and the like. After training, the content moderation ML model is then ready to evaluate ingested content from a customer, for example. Alternatively, a content moderation algorithm can employ image processing and/or text processing techniques to identify prohibited material without using an ML model.

In an example of how an ML model can be used in the content moderation module of the disclosed system, the content moderation ML model can also include or can alternatively include a text processing algorithm that identifies certain keywords or phrases that do not meet the standard for manufacturing the custom products using the end-to-end product customization system. In some examples of the end-to-end product customization system, the content moderation module includes artificial intelligence (AI) or an ML model that continuously develops more detailed information about the standards to better identify and exclude content that should be removed from or prohibited by the system. For example, a neural network may be used as the model for vetting and improving the content moderation of the end-to-end product customization system—using the ML model, the content moderation iteratively improves over time with each data set analyzed. Such a neural network may be viewed as a system of interconnected artificial "neurons" that exchange messages between each other. The connections have numeric weights that are "tuned" during the training process, so that a properly trained network will respond correctly when presented with an image or text pattern to recognize, such as a brand, logo, or illicit text, for example. In this characterization, the network consists of multiple layers of image or text-detecting "neurons;" each layer has neurons that respond to different combinations of image and/or text inputs from the previous layers. Training of a network is performed using a "labeled" dataset of prohibited (or alternatively, permitted) image and/or text inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (e.g., using a sigmoid response function).

The above description of how AI or ML models can be incorporated into the disclosed system applies to other modules, components, algorithms, etc. and are not limited to content moderation. While some additional examples of uses in the disclosed systems for AI/ML models are discussed below, these are not limiting and such models can be used in any portion, or no portion of the disclosed system in various embodiments.

Referring back to the content moderation module, throughout this disclosure various entities including consumers, customers/distributors, and decorators input and access content like text and artwork on the centralized system. Some examples of the end-to-end product customization system include a content and/or intellectual property moderation module that regulates ingested content from any one or more entities for various standards. Some of the standards are entity specific, such as ingested content is required to meet the decorator's text, image, or color requirements. Other standards, however, monitor for inappropriate or offensive content, illegal content, harmful or insulting content, logos and brands, copyrighted materials, and the like. The content and/or intellectual property moderation module identifies content that needs to be moderated by any suitable image processing or image analysis technique or text processing techniques. In some examples, the content moderation module is a first module through which all ingested content to the end-to-end product customization system is processed for evaluation to ensure the content that is further processed along the product customization supply chain is first vetted for the set standards. The standards can be set by the end-to-end product customization system and/or by industry entities or other entities in the supply chain.

Figure 4B:
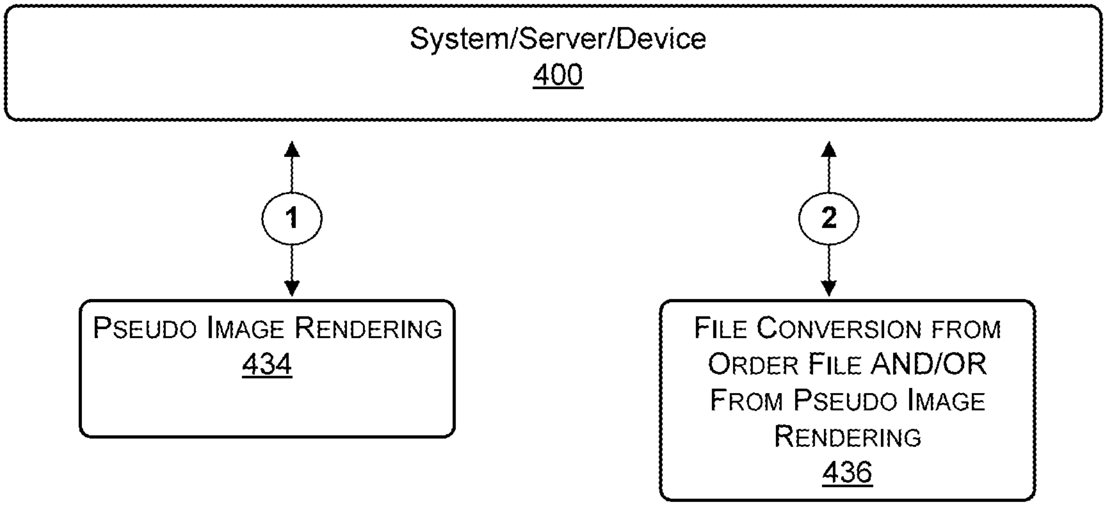
Figure 4C:
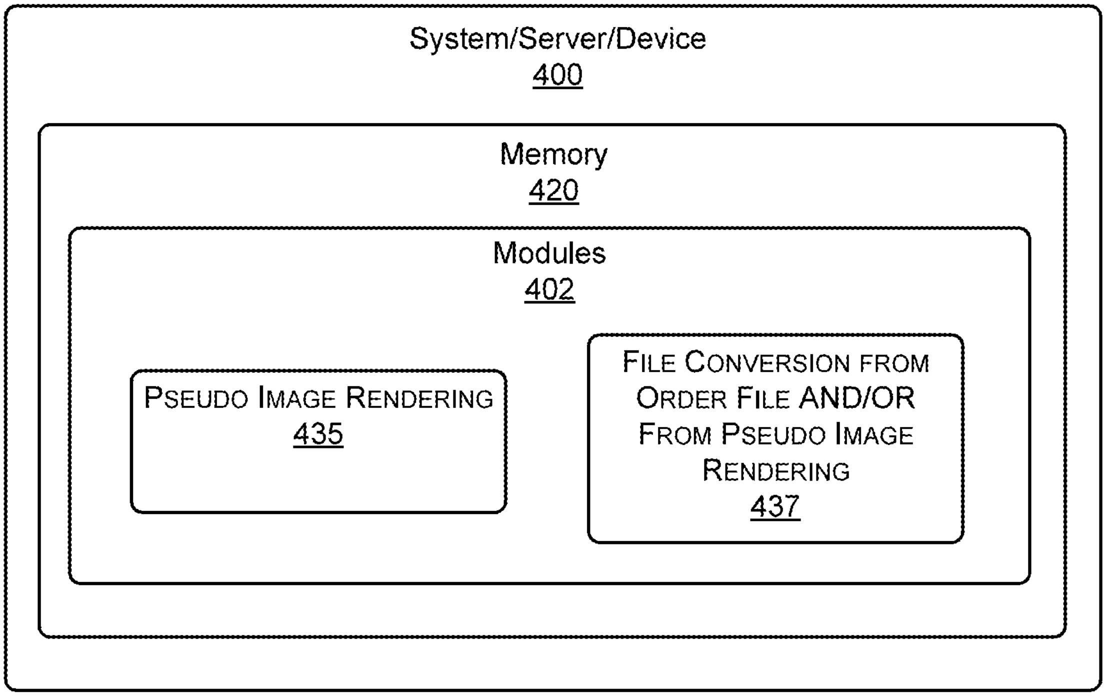
Figure 4D:
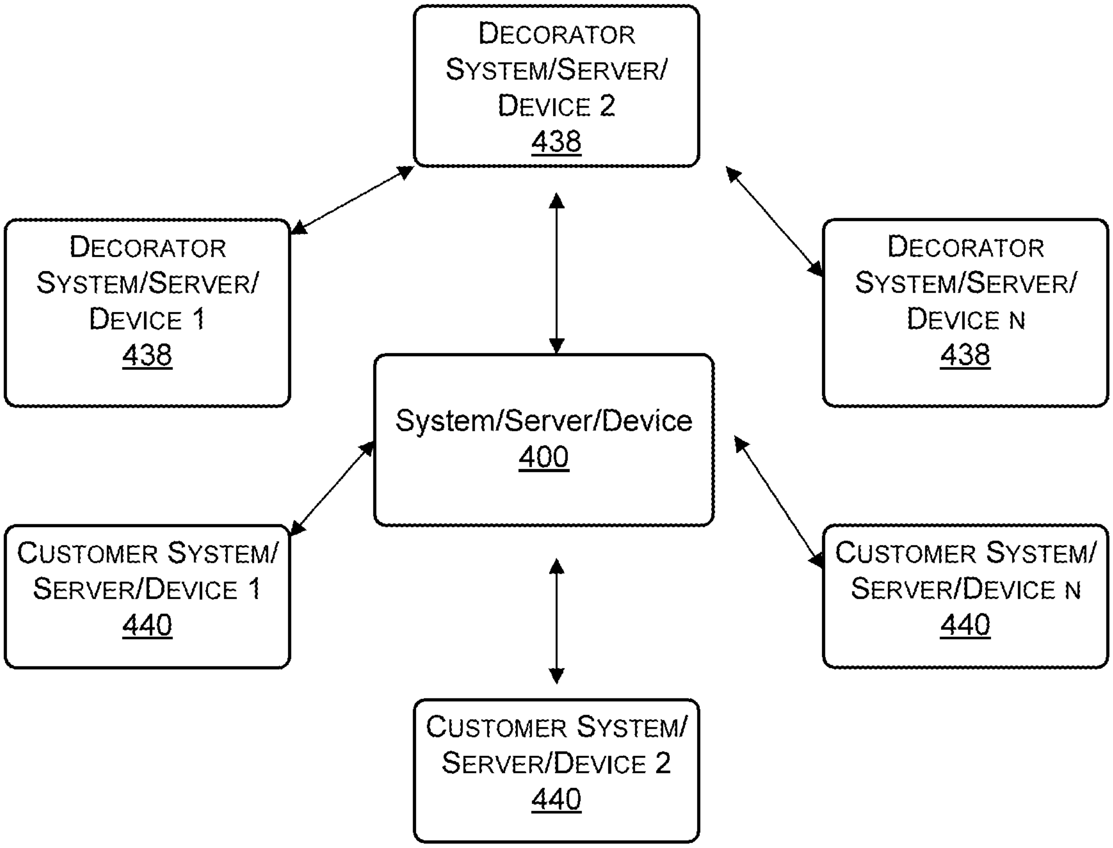

FIG. 4B shows that the end-to-end product customization system/server/device 400 interacts with a remote system/server/device that includes the pseudo image rendering 434 module and the file conversion module from the order file and/or from the pseudo image rendering 436, as described above. FIG. 4C shows another embodiment in which the end-to-end product customization system/server/device 400 includes a pseudo image rendering 435 module and a file conversion module 437 that are stored in the modules 402 of the memory 420. FIG. 4D shows an example computing environment in which the system/server/device 400 is electronically connected via any type of connection to multiple decorator system/servers/devices 438 and multiple customer system/server/devices 440. Each of the multiple, individual decorator 438 and customer 440 system/server/devices interact with the centralized end-to-end product customization system/server/device 400. In contrast, conventional systems require that each decorator and each customer interact directly with each other, which causes uncertainty, delay, inefficiencies, and generalized frustrations with the customized product ordering process.

Figure 4E:
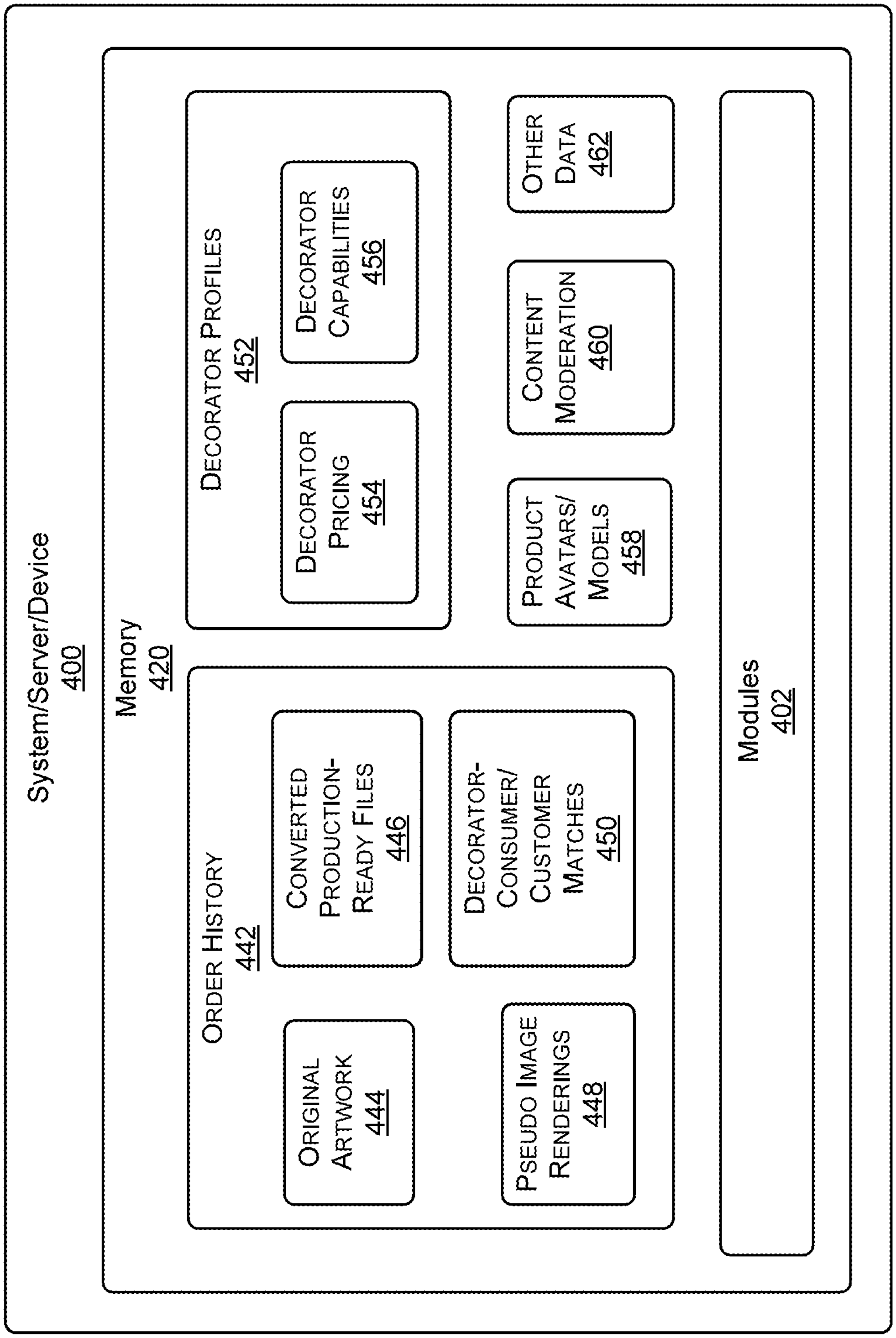

FIG. 4E show another example computer architecture for the disclosed end-to-end product customization system 400 in which the memory 420 includes several datasets or datastores that interact with or are accessible by the modules 402. Data store 442 includes stored order history for each customer (orders placed), consumer (orders placed), and/or decorator (orders fulfilled). The order history 442 can store original artwork 444 ingested by the system 400 from customers and/or consumers and converted production-ready files 446 and pseudo image renderings 448 generated for each order. The order history 442 can also store decorator-consumer or customer matches 450 for all orders. Various modules 402 can access the order history when customers or consumers wish to re-order or purchase custom products that are similar to a previous order. Accessing one or more of the original artwork 444, converted production-ready files, 446, pseudo image renderings 448, and/or decorator-consumer/customer matches 450 from the order history reduces the number of steps required to produce the later-ordered customized products.

For example, if a customer wishes to re-order the same artwork applied to the same product using the same manufacturing technique, the system 400 is only required to retrieve a previous order and process it for another production. In another example, a customer places an order with the same artwork, but applied to a different product using a different manufacturing technique that one of their preferred decorators is capable of producing. Here, the modules would retrieve the original artwork 444 and the decorator-consumer/customer match 450 from the previous order, but the end-to-end product customization system 400 would be required to convert the original artwork 444 to a new converted production-ready file for the manufacturing technique of the new order and would generate a new pseudo image accordingly, both of which are stored in their respective data stores 448, 446.

The memory 420 can also store decorator profiles 452 accessible by the modules 402. The decorator profiles 452 include decorator pricing 454 and decorator capabilities 456 in this example shown in FIG. 4E. Each decorator populates and updates their respective decorator pricing 454 and decorator capabilities 456 to ensure accurate and timely pricing and product time estimates. The decorator pricing 454 can be a set fee schedule based on selected characteristics of the custom order, such as volume, manufacturing type, processing status (e.g., rush status requires a premium fee), industry fluctuations, etc. The decorator capabilities 456 are the type and volume of custom orders the decorator is capable of processing, such as the type of customization options in which they have expertise or have equipment to process, the volume at which they can process orders, and other data associated with their manufacturing capabilities.

FIG. 4E also shows that the memory 420 can include data stores of product avatars or models 458, content moderation 460, and other data 462, as needed. The product avatars are virtual models either generated from a model, a compilation of models, or based on empirical data about models or other model data. Models can be human or products and are not limited to any category of image. The content moderation module 460 can store data about excluded brands, logo, offensive or explicit text or images, and the like.

In some example, the end-to-end product customization system 400 sends the all ingested content to a human user for analysis and approval or to a third-party analyzer, which can include another algorithm module in the same or a remote computing system. In the example in which a human user must approve the content, the human user is prompted to send an approval or a rejection of the content to the end-to-end product customization system. In other examples, the end-to-end product customization system includes the content moderation module that does an initial analysis of the ingested content before sending it to a human reviewer for further analysis. In this example, the content moderation module detects content that should be removed and pauses or terminates the processing of the custom order. If the content moderation module instead detects content that might not meet the set standard, then it may send it to a human for more detailed review before pausing or terminating further processing of the customer order, in other examples.

The disclosed end-to-end product customization system can be fully automated between each step of the customization process in some examples. The fully automated system includes a centralized controller that controls ingested and transmitted data from/to each entity in the supply chain and automatically prompts, transmits, or otherwise progresses the product customization process. In other examples, one or more phases of the customization process include a human-controlled or manually prompted action to progress the customization process. Any suitable combination of automated progress of the customization process, manual prompting to one or more entities, and human-controlled steps can be included in the disclosed end-to-end product customization system.

Figure 5:
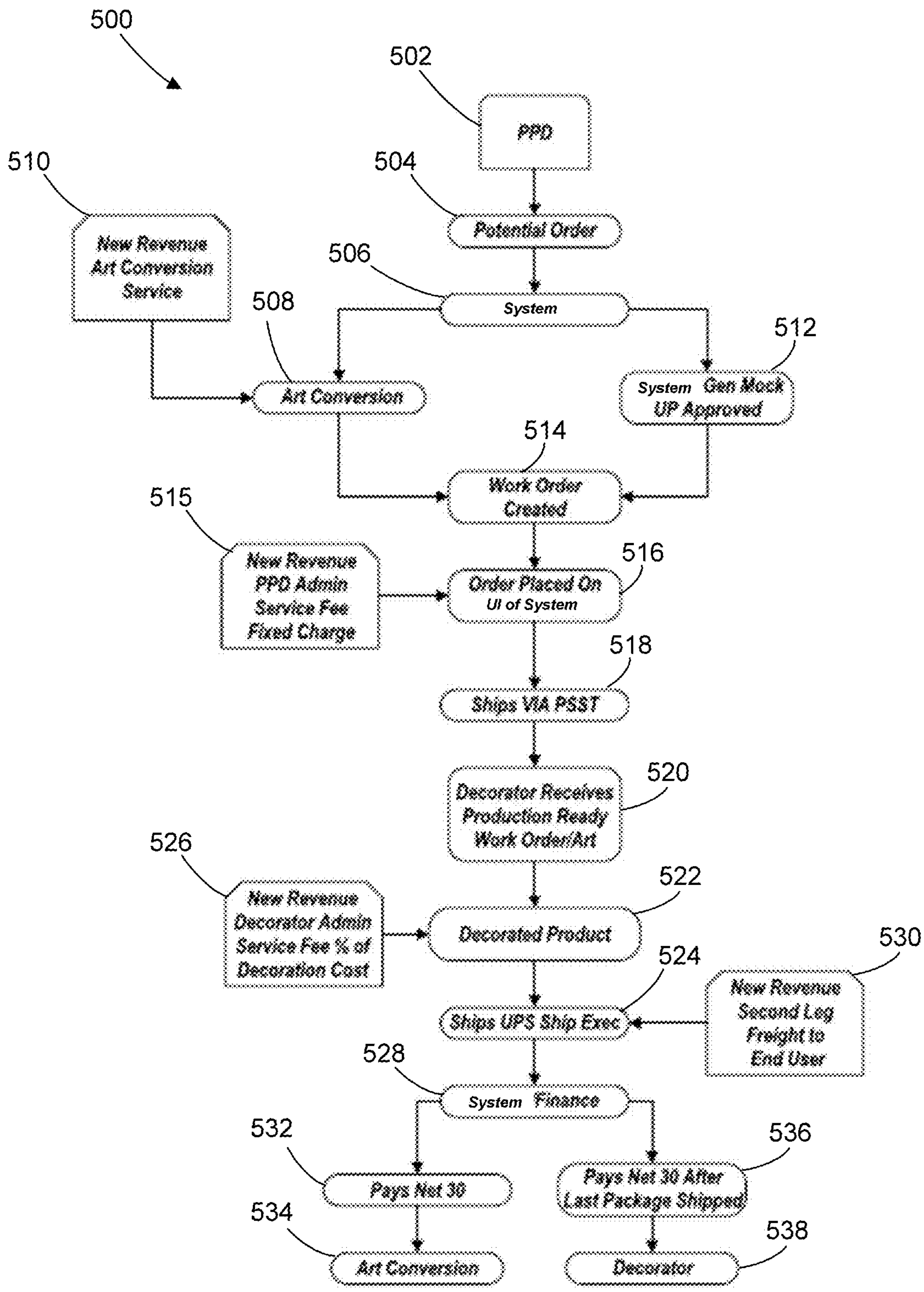
FIG. 5 shows a process flow diagram of another example end-to-end product customization process.

FIG. 5 shows a flowchart of another example end-to-end product customization system 500. In this example, the personalized product distributor (PPD) 502 submits a potential order 504 to the centralized system 506. The centralized system 506 determines that the submitted artwork for the potential order needs to be converted 508 by a conversion service 510. The system also generates a mock up that is approved by the PPD 512. Based on the converted art file and the approved mock up, the system then generates a work order 514 for the custom products and places the work order on the UI or a dashboard of the system 516. In some examples, a New Revenue PPD administrative service fee is applied, which can be a fixed or variable charge 515. This PPD administrative service fee can be applied if/when a new PPD is matched to a customer/distributor, for example. The shipping details are also determined by the system with instructions on how the custom order will be shipped and with which logistics company and shipping speed 518. The decorator producing the custom products receives the production-ready work order and art file 520 and produces the decorated products 522. The decorator ships the decorated products to the customer via a selected logistics partner 524. If a decorator is engaged to customize the products, that decorator can charge a New Revenue Decorator Administrative Service Fee to decorate the items and set up the customer for their first order 526. If specialized freight shipping is required, the system generates a New Revenue Second (or subsequent) Leg Freight cost that is charged to the customer or consumer 530. The system finance module 528 generates payment terms and conditions 532, 536 for the conversion house or art conversion 534 and the decorator 538, respectively.

Figure 6A:
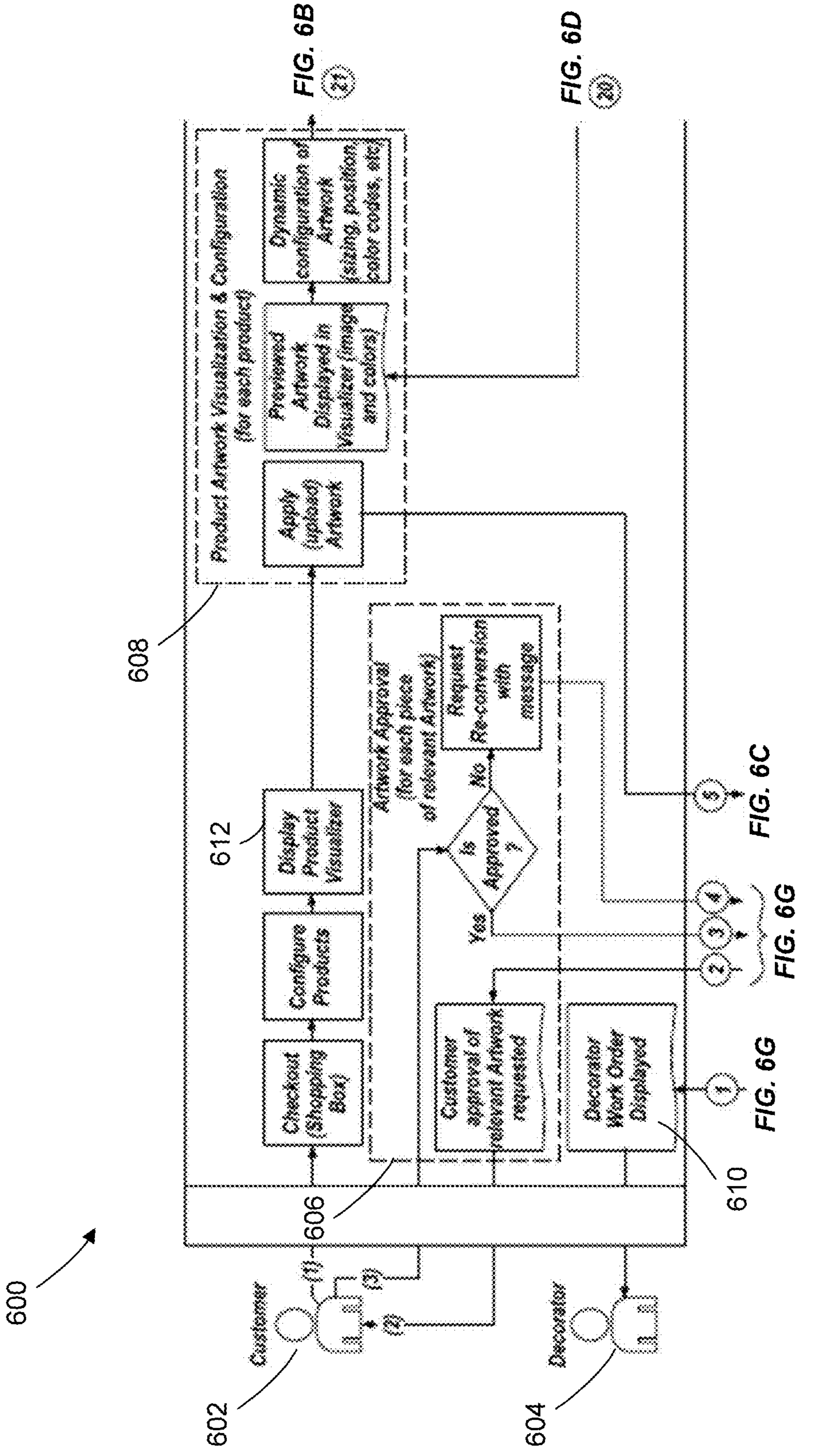
FIGS. 6A-6H show a process flow diagram of yet another example end-to-end product customization process.
Figure 6B:
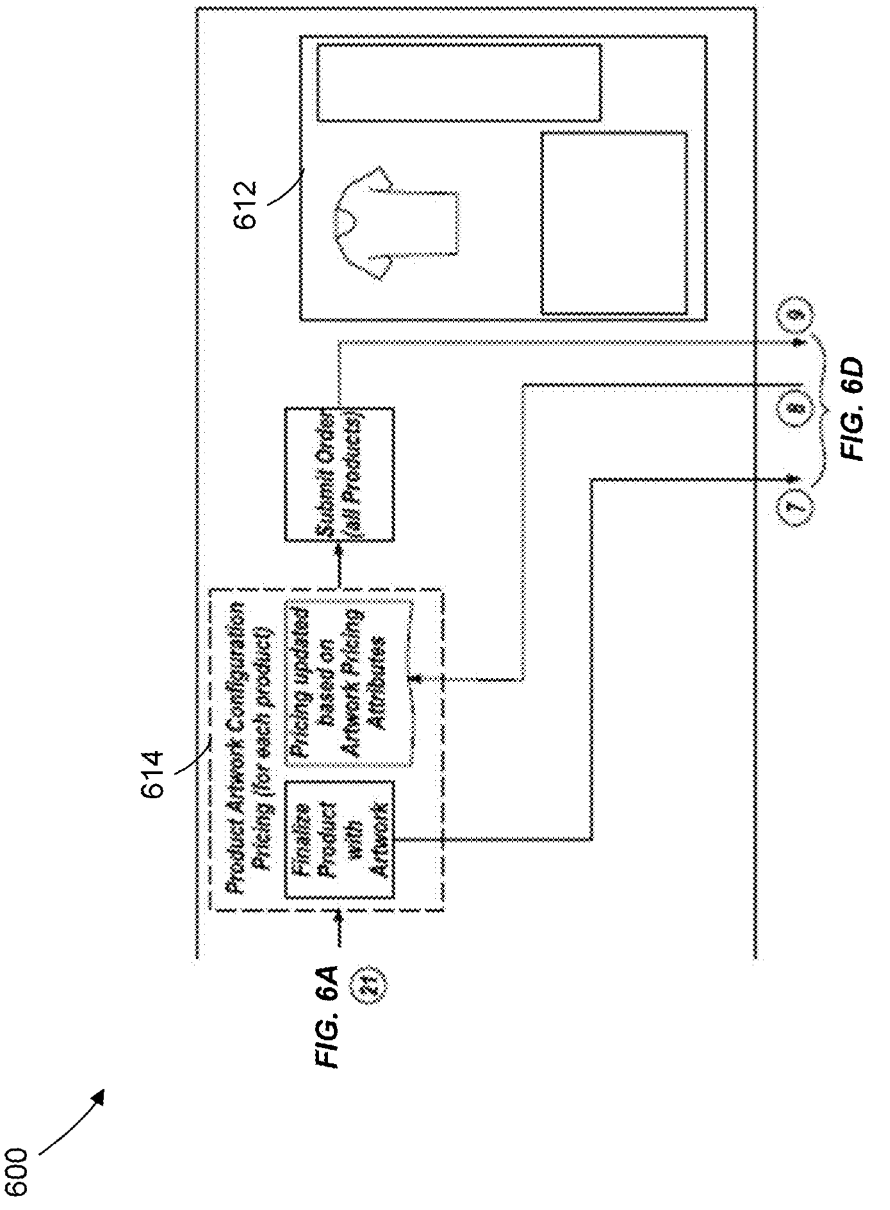

For example, FIGS. 6A-6H show a flowchart of a portion of an automated, end-to-end product customization system 600. FIGS. 6A and 6B show a customer 602 and a decorator 604 interacting with the system 600 through respective dashboards 612, 610. The example automated system 600 provides an artwork approval process 606 and a product artwork visualization 608. The artwork approval 606 includes the customer approval process and edits, if necessary. The decorator work order is displayed on the decorator dashboard 610 and the product visualizer is displayed on the customer dashboard 612. The system 600 also includes a product artwork configuration pricing module 614 that generates a price for the custom product and updates the price based on any artwork pricing attributes, such as change orders, file conversion and the like.

Figure 6C:
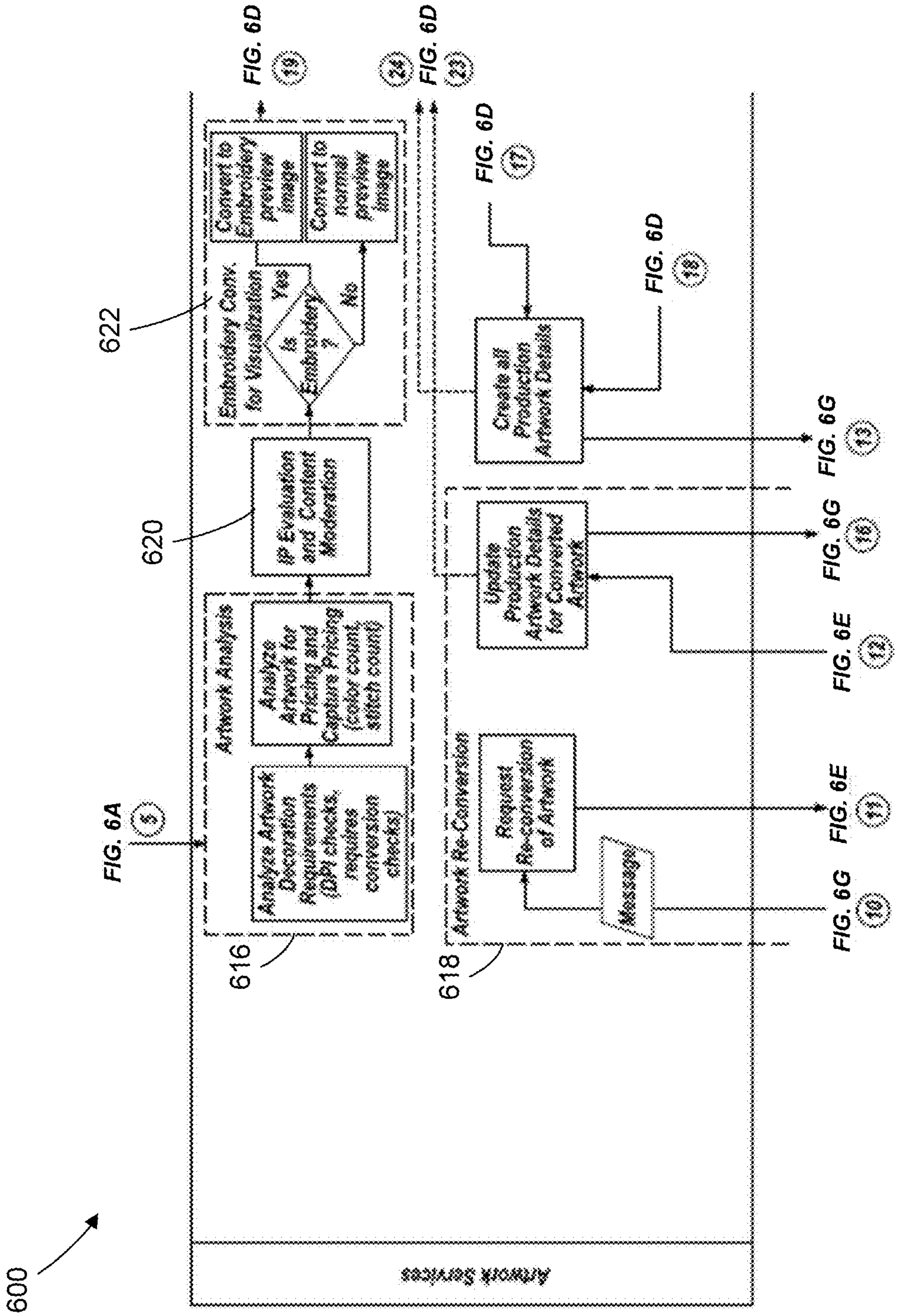
Figure 6D:
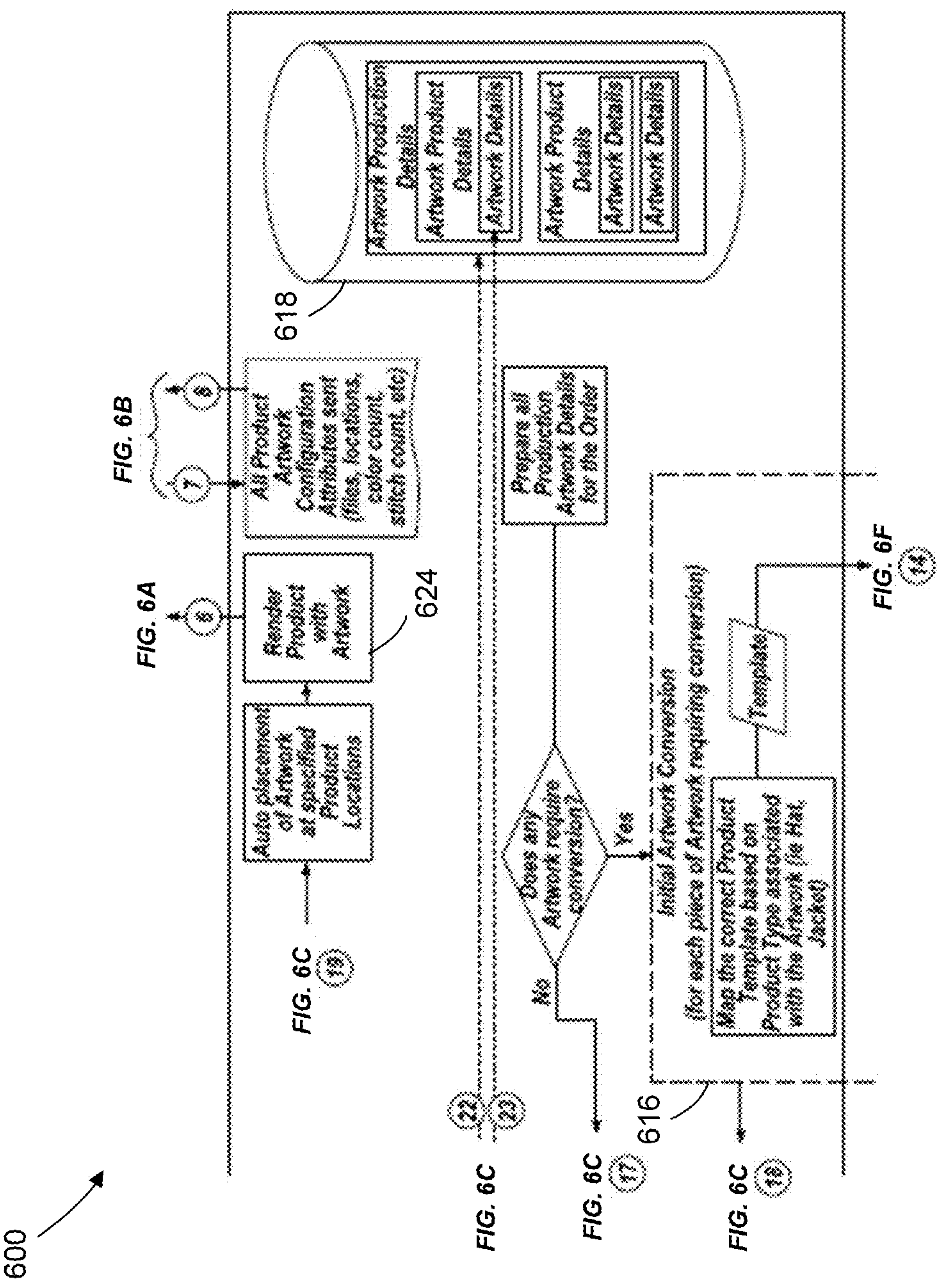

FIGS. 6C and 6D show a flowchart of another portion of the automated, end-to-end product customization system 600 that includes steps of the artwork services, which include artwork analysis 614, artwork conversion 614 and re-conversion if needed, and artwork production and product details 618. As part of the artwork analysis, the system 600 evaluates the artwork for intellectual property and content moderation 620. In the example shown in FIGS. 6C and 6D, the system 600 determines whether the custom order includes embroidery in an embroidery evaluation module 622 that converts and creates an image rendering of any custom order that includes embroidery as a customization option. The proposed customized product is rendered with the artwork 624 and sent to be visually displayed on the customer and/or the decorator dashboards.

Figure 6E:
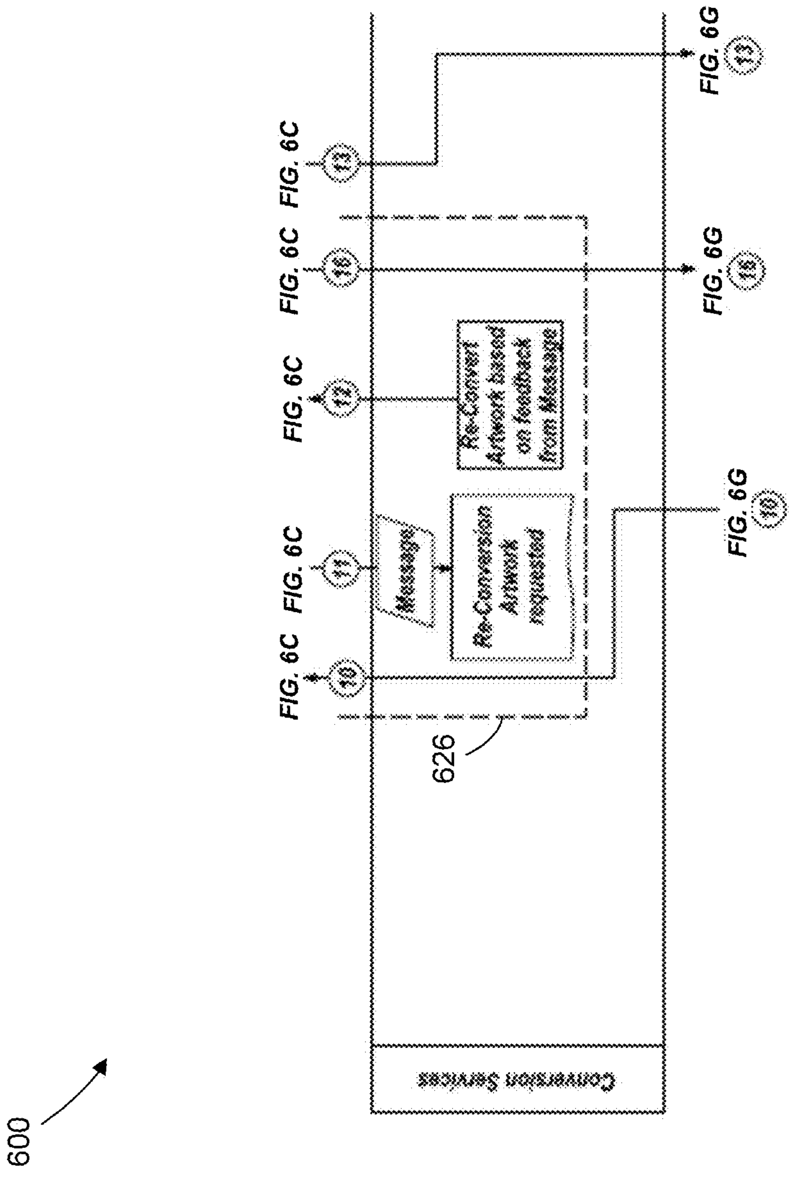
Figure 6F:
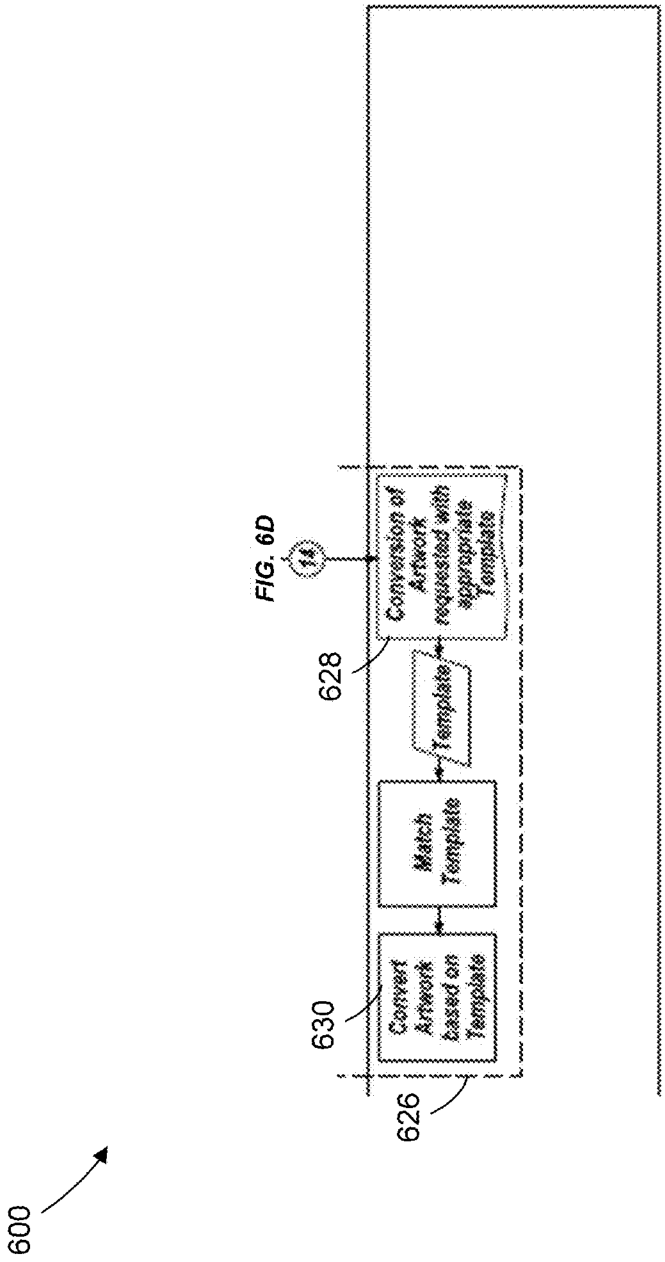
Figure 6G:
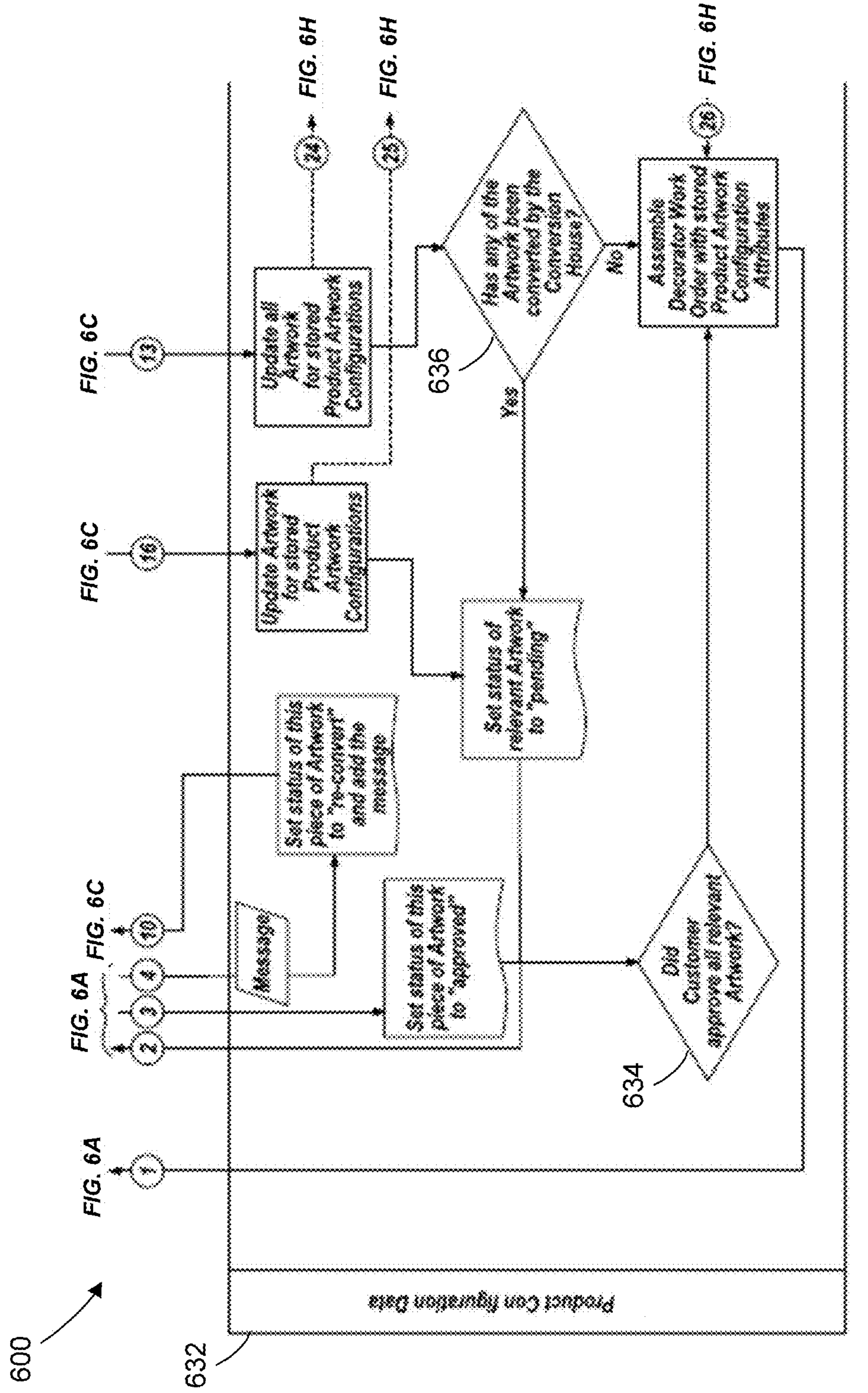
Figure 6H:
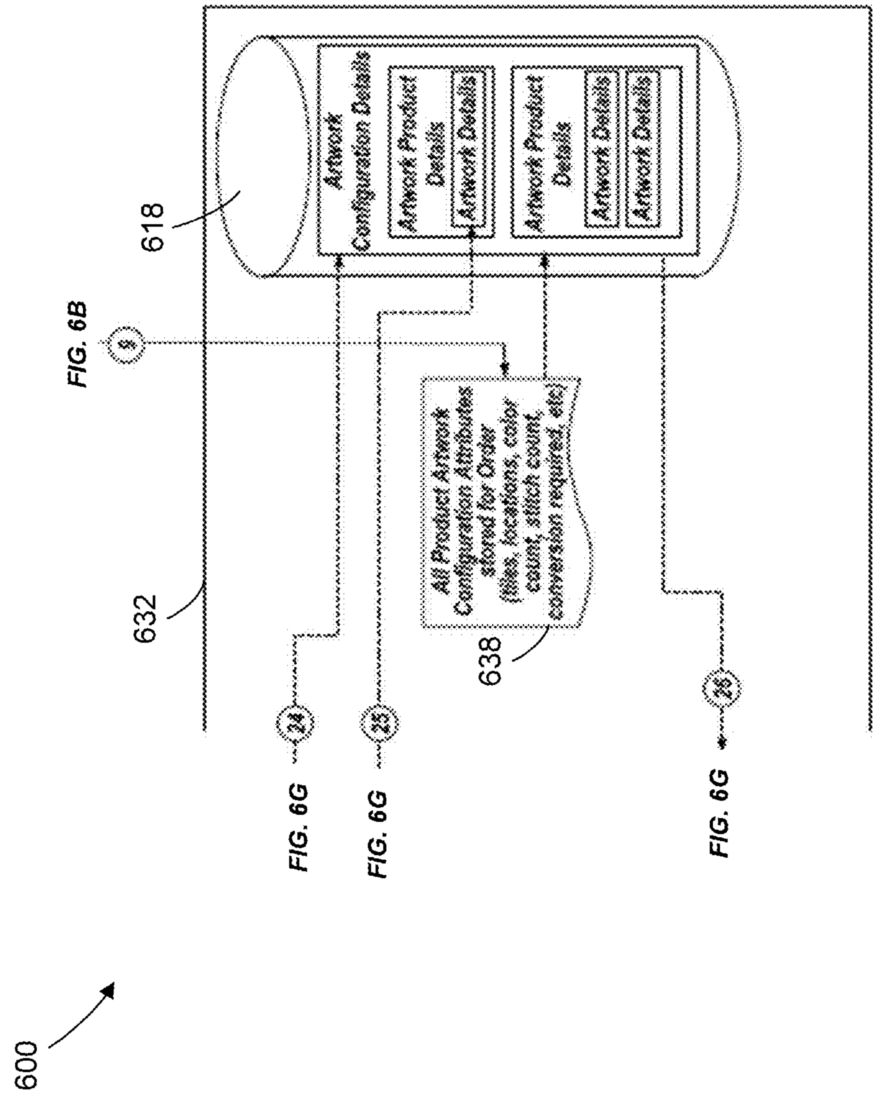

FIGS. 6E and 6F show the conversion services of the automated, end-to-end product customization system 600, which include converting and re-converting, if needed, the original artwork into a production-ready file. In this example, the artwork is converted accordingly to an appropriate template conversion 628 for the manufacturing type of the custom order to produce a converted artwork that is based on the template 630 so the products can be decorated by the decorator. FIGS. 6G and 6H show the product configuration data 632 of the automated end-to-end product customization system 600. The product configuration data 632 compiles the data necessary to complete the custom order. In this example, the product configuration data 632 includes, but is not limited to, data such as verifying that the customer approved the artwork 634, verifying if any of the artwork was converted by a conversion house 636, and determining that all product artwork configuration attributes are properly stored for the customer order 638.

In another example, a consumer wishes to place a custom order to apply artwork to a garment for mass production. This example relates to garments specifically, but this end-to-end product customization system can be used to create to any customizable product including, but not limited to, bags, headwear, office supplies, blankets, work gear, safety gear, personal protective equipment, drinkware, other hard goods, and furniture. In the conventional systems, a consumer places an order with a customer or distributor who is required to engage a decorator to evaluate the artwork provided by the consumer; a supplier to provide the blank cut-and-sew garments; and a manufacturer to apply the custom artwork to the garments. It is also possible that the customer or distributor is required to engage a conversion house to convert the artwork file to a production-ready file with manufacturing instructions that can be used by the manufacturer that applies the artwork to the garments. In this example, the decorator is a third-party advertisement specialist that interacts directly with the consumer. The third-party advertisement specialist places an order with the manufacturer for the garment blanks (e.g., manufactured garments ready to customize). The third-party advertisement specialist also engages a decorator—either an in-house decorator or a third party contracted decorator—that is responsible for managing assessment of the artwork. This decorator determines whether the artwork can be applied to the garment at a high quality and may suggest changes to the artwork or the chosen garments if they discover a mismatch or a quality concern during their evaluation. The end-to-end product customization system determines if the application of the customization can be applied in relative accuracy (or within a tolerance) to the product blank.

The decorator artwork evaluation is a module in which an AI or ML model can be used to evaluate the artwork based on the custom order features. For example, the ingested artwork file can be analyzed using an artwork evaluation AI model to determine if it meets quality standards or if the file requires conversion. Such an artwork evaluation AI or ML model can be first trained on known files that require changes, such as an increase in stitch count for an embroidery order or selecting a different garment for a customization option due to a quality mismatch. The artwork evaluation AI or ML model could also determine if a file conversion is necessary—identify a received file, and determine, based on the features or characteristics identified in the received file, whether the selected customization option requires additional or different instructions to manufacture the customized products. The system can also include a decorator artwork algorithm, that is not an AI or ML model, that identifies certain features, qualities, or characteristics of the artwork via image processing or the artwork file by file analysis to determine whether a change is required or a file conversion is required to produce a high-quality customized product. Such an algorithm can also be employed by third party vendors after receiving the request from the system to evaluate the artwork for file conversion and/or required order changes. The artwork evaluation algorithm can identify certain files or custom orders requiring a change order and output the specific change order or file conversion recommendation. The artwork evaluation algorithm can additionally or alternatively send such an output to a human artwork evaluator to approve or further evaluate before notifying the centralized system of the change order or file conversion.

For example, the consumer wishes to embroider moisture wicking fabric with an embroidered company logo and places such an order with a distributor. The distributor engages a decorator to evaluate the consumer provided artwork and the customization option. The decorator's evaluation (human and/or algorithm) of the custom order concludes that the selected garment does not have enough fiber structure or rigidity to sustain the process to apply a high-quality embroidery. The decorator reverts to the consumer with a change order recommendation to select a garment with a more structured fabric or to select a different type of application to the selected garment, such as a flexible applique.

During the artwork evaluation, the decorator also discovers that the artwork provided by the consumer does not align with standards for a manufacturer to apply it to the selected garments and recommends that either the decorator or a conversion house convert the file to a production-ready file type. The consumer receives this information after the distributor has engaged a manufacturer that is capable of handling embroidery (as originally requested in the custom order) but does not have the capabilities to apply a flexible applique to the garment. In a conventional system, the distributor is left with a disconnect between the decorator's change order recommendations and/or file type requirements for the production-ready file (the file needs to be converted) and the manufacturer's capabilities without an option to coordinate the two entity requirements or capabilities, which increases the cost that must be paid by either the distributor or the consumer and delays the project.

In this example, the price could increase significantly based on the required custom order changes, the changes might require substantial time delays, the quality of the custom products suffers, or the custom order has other undesirable outcomes. This disconnected supply chain from the consumer's custom order to product quality control produces uncertainty in quality and pricing, inefficiencies, time delays, frustrations, and overall disengagement in the product customization process. Consumers facing such challenges often find other solutions to their purchasing needs, such as foregoing customization entirely or finding lower quality options or simply accepting these frustrating risks. In this example, the distributor is the customer for purposes of interacting with the decorator, manufacturer that will apply the artwork, and a conversion house, if necessary. In other examples, the customers could also be the direct consumers. In yet other examples, the customers include both the distributor selling customized products to consumers and the consumers placing custom orders with distributors. Each entity engaged in the customization system supply chain has its own customer. In this disclosure, the consumer or end user is the entity that places the custom order, such as customized jackets for example. It is this consumer or end user placing the custom order that sends the customization request(s) to a custom apparel company or "distributor" that then engages other entities in the product customization supply chain.

Regardless of the entity—consumer and/or distributor—that interacts with the decorator, it is the disclosed end-to-end product customization system that provides a single, connected supply chain for the customer and all entities along the product customization supply chain at each phase of the product customization process. The supply chain to create customized products is improved with the disclosed end-to-end product customization system by connecting each phase of and each entity engaged in the product customization process to create a smooth, streamlined system to transform mass produced products into customized products at the desired scale. The end-to-end product customization system further improves the conventional product customization supply chain by offering pricing efficiencies and improved pricing transparencies by calculating an accurate price and feasibility of the applied customization early in the customization process. The system includes a pricing tool that determines an accurate price and feasibility of artwork, decoration method, garment match to customization, and the like to provide a dynamic way of pricing the custom order early in and throughout the customization process. In some examples, the pricing tool provides dynamic pricing through selection of the blank, decoration/artwork application/customization, and matching to a decorator or other entity in the supply chain.

In the custom garment example, the garments are typically garment blanks mass produced by a garment cut-and-sew manufacturer that supplies a distributor with the blanks for customization by a decorator. In some examples, the garments themselves are custom ordered to specific end user specifications, particularly if an end user wishes to purchase a unique size or a garment with a special feature. For example, a person that sized in a way that does not align with traditionally sized garments may wish to purchase a custom sized garment that fits them well. That custom sized garment is created by a cut-and-sew manufacturer that specially manufactures the garment accordingly. The custom-sized garment is then customized with artwork or other applied custom features by a decorator or manufacturing decorator (the manufacturer that applied the custom artwork or applique to the cut-and-sewn garment).

In other examples, a consumer wishes to purchase garments with a specific feature, such as a specialized garment like a workplace or safety garment with added protective layers for example. A specific cut-and-sew manufacturer with capabilities to create the specialized garment the consumer wishes to order is engaged to create the garment itself. The special-order garments are then decorated. The end-to-end custom product system engages with these cut-and-sew manufacturers that create the "custom" blank garments as part of the centralized product customization process. After the customized garments are created, the end-to-end custom product system engages with the decorator or manufacturer that applies the custom logo or artwork to the customized garments. The custom sized garments that are also customized with artwork require the additional step to engage with cut-and-sew manufacturers to produce custom-sized garments instead of or in addition to ordering garment blanks from a manufacturer that produces the garments in standard sizes.

In an example of uniforms, the garments that a team, company, or school wishes to customize may have custom specifications of their own. A professional sports team, for example, needs to custom fit team jerseys and pants to their players. Those custom-fit jerseys include the player's number and name, which are custom decorations. The pants have a special team color applied. The jerseys and pants both have the team logo applied. The team also wishes to order custom warm-up jackets and pants that include the player number and team logo. The sports team also wishes to provide custom-sized team warm-up jackets and pants for the players and the coaches with each respective player's and coach's name and the team logo. The sports team orders standard-sized jackets that are customized with the team logo for players' and coaches' family members.

In this example, the jerseys and custom-sized team warm-up jackets and pants are custom made by a cut-and-sew garment manufacturer to fit the specification for each player and each coach. The standard-sized jackets for the family members are ordered as garment blanks without sizing customization. When the team submits this custom order to the disclosed end-to-end product customization system, the order is initially separated into two groups—the first group is the custom-sized garment order and the second group is the standard-sized garment order. The end-to-end product customization system sends the custom specifications for the players and coaches to the cut-and-sew manufacturer that creates the garments in the custom sizes. At this stage, no decoration is added to these garments. The custom-sized jerseys are then decorated with the player number and player name for each player. The jerseys and the players' and coaches' warm-up jackets and pants are decorated with their respective player's and coach's numbers. All jerseys and warm-up jackets and pants are decorated with the team logo.

The standard-sized jackets are ordered from a garment manufacturer as garments blanks from a standard-sized garment manufacturer that mass produces the blanks. The garment manufacturer may or may not be the same manufacturer that creates custom-sized jerseys and warm-up jackets and pants for the players and coaches. The custom-sized garments and the standard-sized garments each have different artwork to be applied. The jerseys require a player number and player name specific to each player and a team logo that is applied to all jerseys. The warm-up jackets and pants require a player or coach name specific to each respective player or coach and the team logo that is applied to all warm-up jackets and pants. The families' jackets require only the team logo. Each customization—the player number, player name, and the team logo—requires different artwork and are stored in different custom order files. The end-to-end product customization system receives and manages each of these custom order files for the global team custom order. The team nor any distributor it engages to handle this custom product order is required to individually engage with multiple decorators, conversion houses, cut-and-sew manufacturers, or artwork manufacturers when using the disclosed systems and methods.

The disclosed end-to-end customized product system receives a custom order from an customer that includes a request to customize one or more elements of the order. The customization typically includes a customization file, such as artwork or other customization files that relate to customizing an aspect of the desired products in the custom order. The customization file can include multiple files for multiple artwork or customization requests. For clarity, this disclosure generally describes examples of custom orders with a single customization that may include artwork, such as a logo. However, the custom order can include multiple customizations associated with multiple respective customization files, some of which are produced on custom-sized or standard-sized garments or other products, as discussed above and throughout the disclosure. The custom order includes customization of any desired aspect of the product to be customized, including but not limited to adding artwork to a product, customizing a contour, color, shape, position, or texture of a portion or an entire product, altering or adding components of or features to a product, etc. Within a custom order, different customizations can be applied to a first portion than to a second portion of the products to be customized. Alternatively, the custom order includes a single customization to all of the products that are produced. The customization files can also include instructions for customizing the order. For example, the customization file includes an artwork file of a custom logo along with text instructions that describe the end user's desired position of the logo on a jacket.

The customization file, for example, is evaluated by a system or person, as described above, such as the end-to-end product customization system itself through a customization evaluation module or by a third party, like a decorator or other product customization expert or professional. Aspects of the customization option can come in any form for the end-to-end product customization system to normalize the custom order to a standard format for evaluation by either the customization evaluation module or a third-party decorator, for example.

In the example with a customization evaluation module in the end-to-end product customization system, the module would evaluate an aspect of the customization option to make sure it can be translated into a production-ready custom order that includes files that can be sent to manufacturers to create the custom products. Specifically, manufacturers have requirements to operate their manufacturing equipment that applies the artwork to the blank garment or product. The requirements can be instructions written according to a set of rules specific to the equipment and/or the manufacturer. In some examples, multiple manufacturers have similar or the same production requirements because they apply the customization to the product using the same technique, equipment, or the like. For example, a particular set of instructions is required to operate a machine that applies artwork to a garment—instructions on the location, dimensions, color, color intensity, etc. may be required for a particular industry-standard machine to operate that is used by many decorator manufacturers in the industry. Each of these manufacturers would have similar requirements to operate the machine and may have additional individual requirements for their individual processes. Other example requirements to the machine operation are specific to the manufacturer for their individual processing or internal workflow needs.

The aspects of the customization option that the customization evaluation module evaluates could include artwork to be applied to the products, requests for custom finishes or features of products, custom sizing or configurations of products, and the like. In the example in which a third party, such as a decorator, evaluates the customization option, the decorator submits an evaluation of the customization order to the end-to-end product customization system for processing. The decorator's evaluation of the customization order includes determining aspects of the customization option that could affect portions of or the entirety of the end-to-end supply chain, such as pricing of the custom order, manufacture time, specialty manufacturing services relating to the custom order (embroidery, medium or material specific manufacturing capabilities, availability of high-volume orders, etc.), and the like. The end-to-end product customization system receives the decorator (or third party) evaluation and offers transparency into the production time as the custom order progresses through the supply chain. Production time estimates include but are not limited to the decorator's work, delivery, quantity of ordered products, complexity of the customization, availability of products and decorators, etc.

In many examples, regardless of whether a customization evaluation module or a third party evaluates the customization option for the custom order, they identify a change order that needs to be made to the custom order that will make the custom order product ready. A production-ready custom order is an order that includes all requirements of a custom order ready to be sent to the manufacturer to produce the custom products. As described above, the change order is an aspect, feature, component, or other change that needs to be made to the custom order to create a production-ready custom order. Those changes can include, but are not limited to, changes to an end user-decorator match, changes to pricing, changes to artwork, changes to stitch count or color count, changes, or feedback on an estimated quality of final products with the customization option, and the like by the decorator or a manufacturer, for example.

The change order can also include a change to artwork to be applied to the products being customized. For example, the artwork color count may need an adjustment to a color of a hard good selected for customization to brighten or darken a portion or the entire artwork or the expected stitch count for embroidered artwork may need to be increased or decreased based on a selected fabric of a garment to be customized. The artwork change order can be performed by a human or by an algorithm, that could employ an AI or ML model, or be a standalone algorithm. The artwork change order can include both options in which it is both analyzed by an algorithm (AI/ML or not) and then analyzed a second time by a human reviewer. Regardless of how the change order is created, the recommended change order alters the data or content in the custom order that is further processed. Such an altered custom order is an improved state of the order and/or order file for the custom order to be further processed by a decorator manufacturer. The data in the altered custom order is transformed—whether by edit, deletion, or addition—from the data initially received in the custom order and is now in better condition for smoothly proceeding through the supply chain to the decoration phase.

The end-to-end product customization system also receives or generates itself a conversion recommendation that the order file type (or multiple order file types, depending on the number of order files in the custom order) is required to be converted to a production-ready file type if the received order file type is not compliant or aligned with the manufacturing requirements. The order file type can be analyzed to determine if it includes all features, characteristics, requirements, and/or instructions necessary for the decorator manufacturer to apply the customization option to the product. An algorithm, either a module of the disclosed end-to-end production customization system or employed by a third party like a decorator, evaluates the order file type to identify presence of the characteristics, features, requirements, and/or instructions needed to execute the decoration of the garment blank. This can include, but is not limited to, evaluating the file type for compliance with or compatibility with equipment used by the decorator manufacturer to decorate the product and/or a complete set of instructions for the decorator manufacturer to decorate the product.

As described above, the conversion recommendation can also include specific instructions regarding how the order file should be applied to the product, such as placement or coloring of artwork stored in the order file. Specifically, the conversion of the file may result in warping, re-positioning, color changes, or the like of artwork that requires additional instructions to alter it as close to the original appearance as possible and/or improve a feature or characteristic of its overall appearance quality. As with the change order of the customization option, the conversion recommendation could be generated by a conversion module in the end-to-end product customization system or from a third party, such as the decorator or a conversion house. Both the conversion module in the end-to-end product customization system and a conversion house could also collaborate on a conversion recommendation and/or one could validate the other's conversion recommendation, e.g., a conversion house could validate the conversion recommendation generated by the end-to-end production customization system. A conversion module in the end-to-end product customization system could be an algorithm, AI/ML model, or the like that evaluates the custom order to determine if it meets one or more criteria to create a production-ready file.

For example, the conversion module could determine the file type of the order file and a resolution of an image included in the order file for a logo to be direct-to-garment (DTG) printed on a garment blank. In this example, the conversion module compares the order file type with a list of approved file types for an aspect of the customization option, which is DTG here, and determines that the order file type is included on the list of approved file types. The conversion module also determines that the quality of the order file image is below a threshold resolution for a production-ready file. The conversion module then creates a conversion recommendation that includes data confirming that the file type is approved but the resolution is below a required threshold value for DTG printing of the image on the garment blank. The conversion module transmits the conversion recommendation to a conversion house, that validates the data and generates a recommendation on how to improve the image resolution to meet or exceed the required threshold value for image resolution for DTG printing or simply generates a request or automatically begins converting the file. The conversion can be done automatically, manually, or a combination of both options. For example, the conversion recommendation can be automatically sent by the conversion module of the end-to-end product customization system or the conversion house server to a human to manually convert the order file to a production-ready file with the required resolution.

The conversion house may have its own conversion module as well, which is an algorithm, AI/ML model, or the like that is in addition to the conversion module of the end-to-end product customization system's conversion module. The conversion house conversion module can add more detailed or specific layers of conversion recommendations and/or automatic conversions to the order file.

In the example in which the conversion recommendation is generated by a conversion module in the end-to-end product customization system or the conversion house, the conversion module evaluates the order file type to identify features or characteristics that translate to a production-ready file type. For example, a conversion module could consider the custom order and/or the order file type for particular data in the file type, the file type itself, the case with which the order file type could be converted to a production-ready file type, or the completeness of the data needed for the custom order. The conversion recommendation includes any identified change or recommended action to apply to or change in the order file type to convert it to a production-ready file type. In another example, the end-to-end product customization system determines or stores a production-ready file type of a manufacturer to be able to create the custom products. The production-ready file type can be pre-loaded into the end-to-end product customization system for any one or more manufacturers.

In some examples, the end-to-end product customization system evaluates the order file type. The received order file type is evaluated against the manufacturing file type required to operate the machine that is used to apply the customization option to the blank product to determine any conversion recommendations that are required to transform the order file type into the manufacturing file type. In an example, the end-to-end product customization system matches the production-ready file type to the manufacturing file type alone or in combination with one or more related criteria, such as one or multiple manufacturer capabilities or other features matching the manufacturer to the custom order. For example, the received order file type can be matched to the production-ready file type of a first manufacturer with a simple file type conversion. A second manufacturer could require a more complex file type conversion but offers improved volume capabilities than those available from the first manufacturer. The conversion recommendation could include presenting the customer with both options to allow the customer to select the best option that suits their needs. In some examples, the received order file type is automatically converted to a production-ready file type either through the disclosed end-to-end product customization system or by a third party, such as a conversion house, as discussed above. This auto-conversion example could be a first conversion stage to estimate price and/or determine whether multiple file conversion stages—automatic or manual—may be needed. The first stage auto-conversion can be done to determine an initial price based on available decorators. In some examples, the available decorators are pre-selected by the customer based on set criteria, such as prior relationship, geographic proximity, technical or manufacturing expertise, and the like.

In this example, two decorator manufacturers have different file types required for them to respectively manufacture the customized products, which means the file conversion to match the custom order would differ for each decorator. In this example, before the conversion occurs, data is transmitted to the customer to select or approve a particular decorator. After the customer selects the decorator of choice, the decorator manufacturer can proceed by either converting the order file themselves or sending it to a conversion house for file conversion to a production-ready file. In another example, the order file type is compared to a universal feature, characteristic, or entire file type common to all manufacturers. In yet another example, the order file type is compared to a universal feature, characteristic, or criteria for several different file types that are used by available manufacturers.

In the example of the end-to-end product customization system in which a third party evaluates the order file type to determine whether it complies with manufacturing requirements of a decorator, the third party evaluates the order file type to identify features or characteristics that are required to translate the order file to a production-ready file. As with the conversion module example, the third party considers the custom order and/or the order file type for particular data in the file type, the file type itself, the case with which the order file type could be converted to a production-ready file type, or the completeness of the data needed for the custom order. The third party then creates a conversion recommendation that includes the changes that are needed or desired to produce a high-quality custom product. The end-to-end product customization system ingests or otherwise receives the third-party conversion recommendation. The third party can include a decorator, a conversion house, or feedback from both a decorator and a conversion house. In some examples, the decorator would make a conversion recommendation that is also evaluated by the conversion house to produce a combined decorator-conversion house conversion recommendation for the end-to-end product customization system to ingest.

The end-to-end product customization system generates a production-ready custom order that is based on the change order and the conversion recommendation. As described above, the production-ready custom order is the order that complies with all production requirements of the decorator manufacturer. The production-ready custom order also includes recommendations and requirements of the decorator manufacturer regarding custom product quality to ensure that the selected products can support the applied customization. The end-to-end product customization system generates a customer/consumer prompt that includes the production-ready custom order, in some examples. That customer/consumer prompt is output for approval by the customer and/or consumer, another party, or multiple parties in this example. Alternatively, the production-ready custom order is not approved by any party after being generated by the end-to-end product customization system and simply progresses to production.

The end-to-end product customization system can receive a response to the customer/consumer prompt that includes an approval of the production-ready custom order. This response can be input by the customer, consumer, another party, or multiple parties, which can include the customer, consumer, a distributor, and/or the decorator, for example.

The end-to-end product customization system can also, in some examples, generate progress alerts, that are transmitted to any one or multiple parties or entities in the supply chain. The progress alerts can include identified challenges, delays, changes in pricing, and/or progress along the supply chain relating to the production-ready custom order. In some examples, the end-to-end product customization system generates and/or outputs an alert that the production-ready custom order is complete to any entity, including the customer and/or consumer. When the production-ready custom order is complete, the end-to-end product customization system can then generate a request to audit or a customer or consumer prompt to recommend an audit of a unit or select group of the completed customized products in the production-ready order. Such an audit evaluates the customized products for quality, accuracy, durability, timeliness, and any other selected or desired condition of the finalized custom products.

Figure 7A:
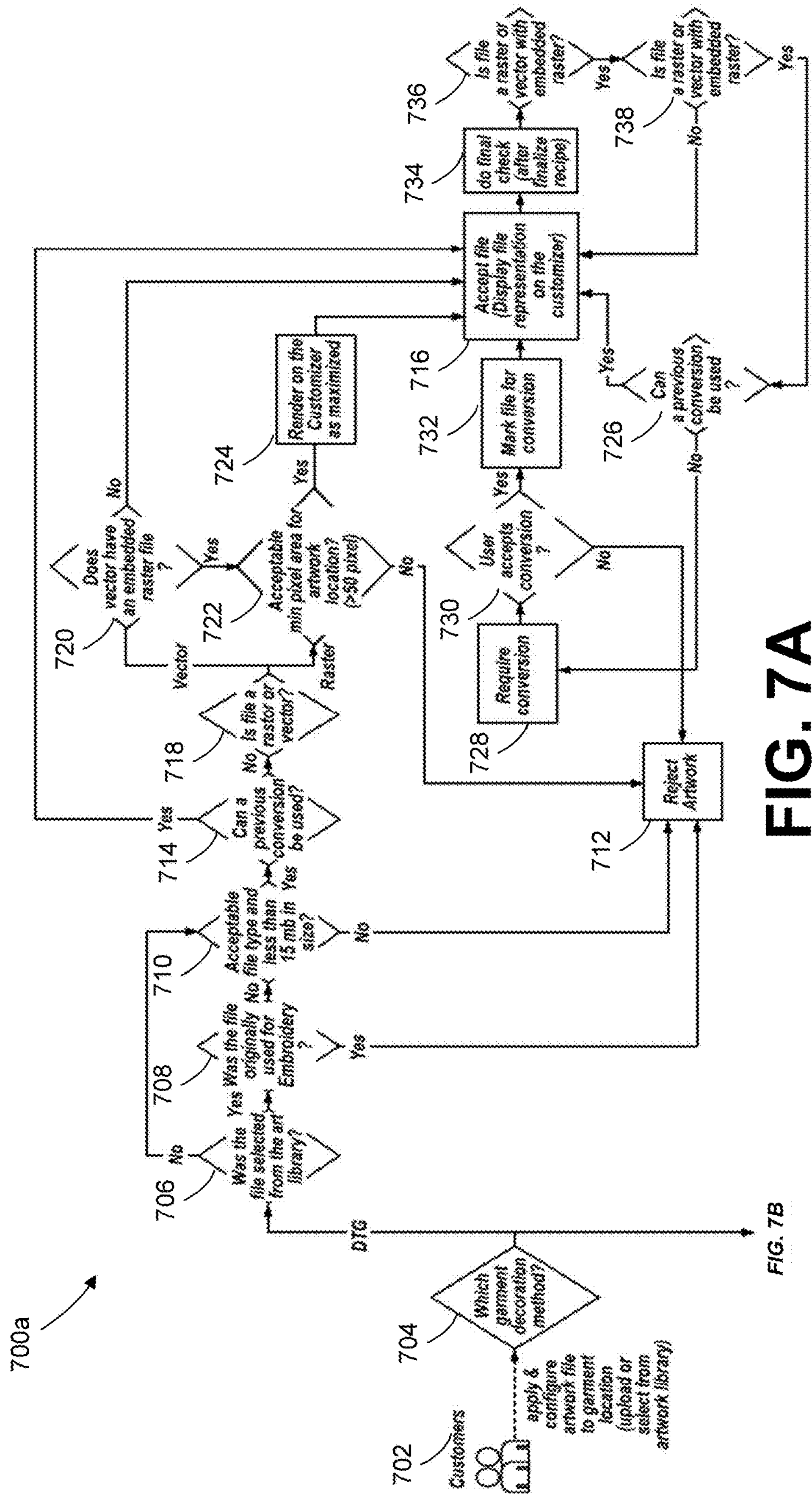
FIG. 7A-7C are process flow diagrams for evaluating a custom order for direct-to-garment, screen printing, and embroidery customization options, respectively.
Figure 7B:
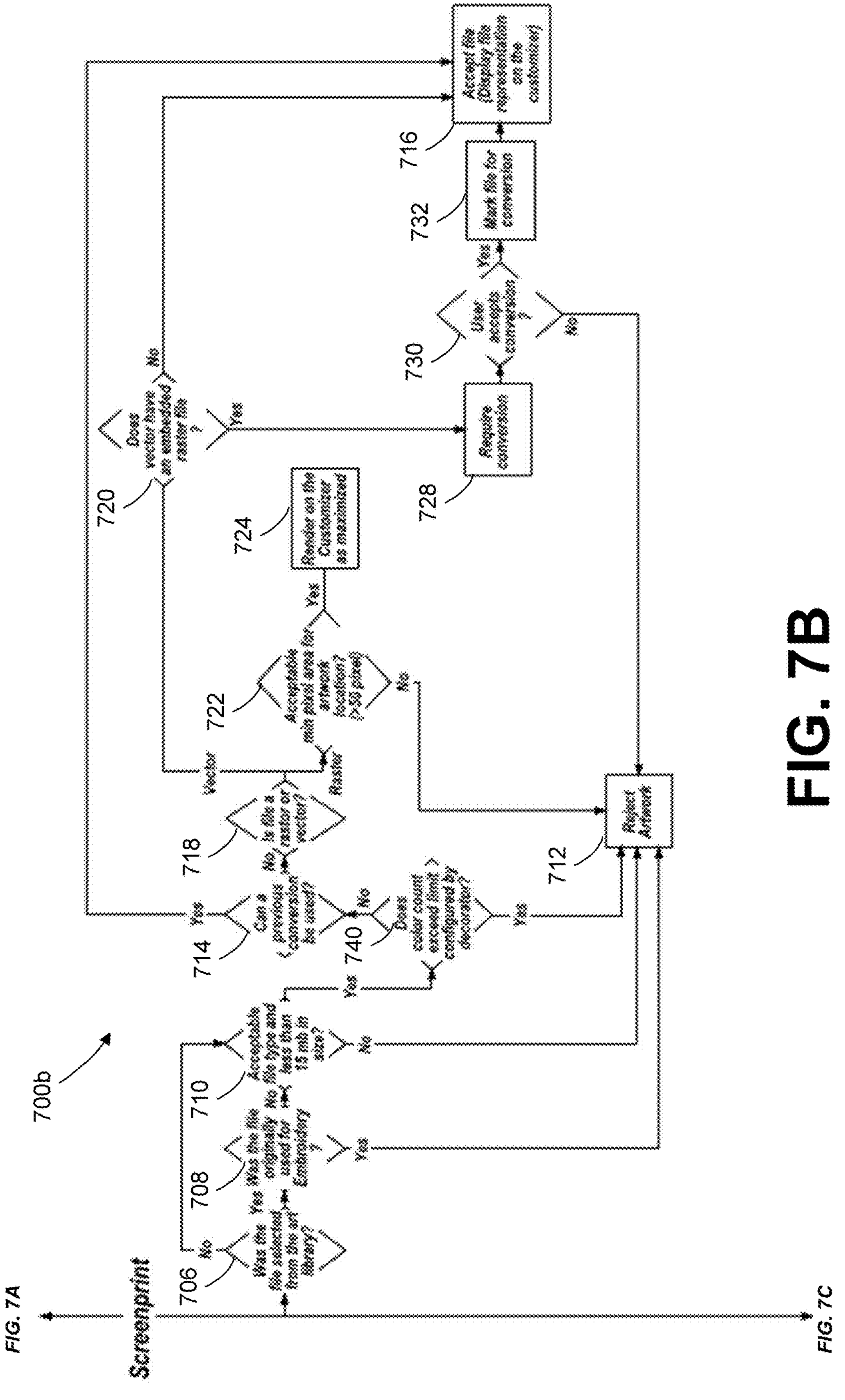
Figure 7C:
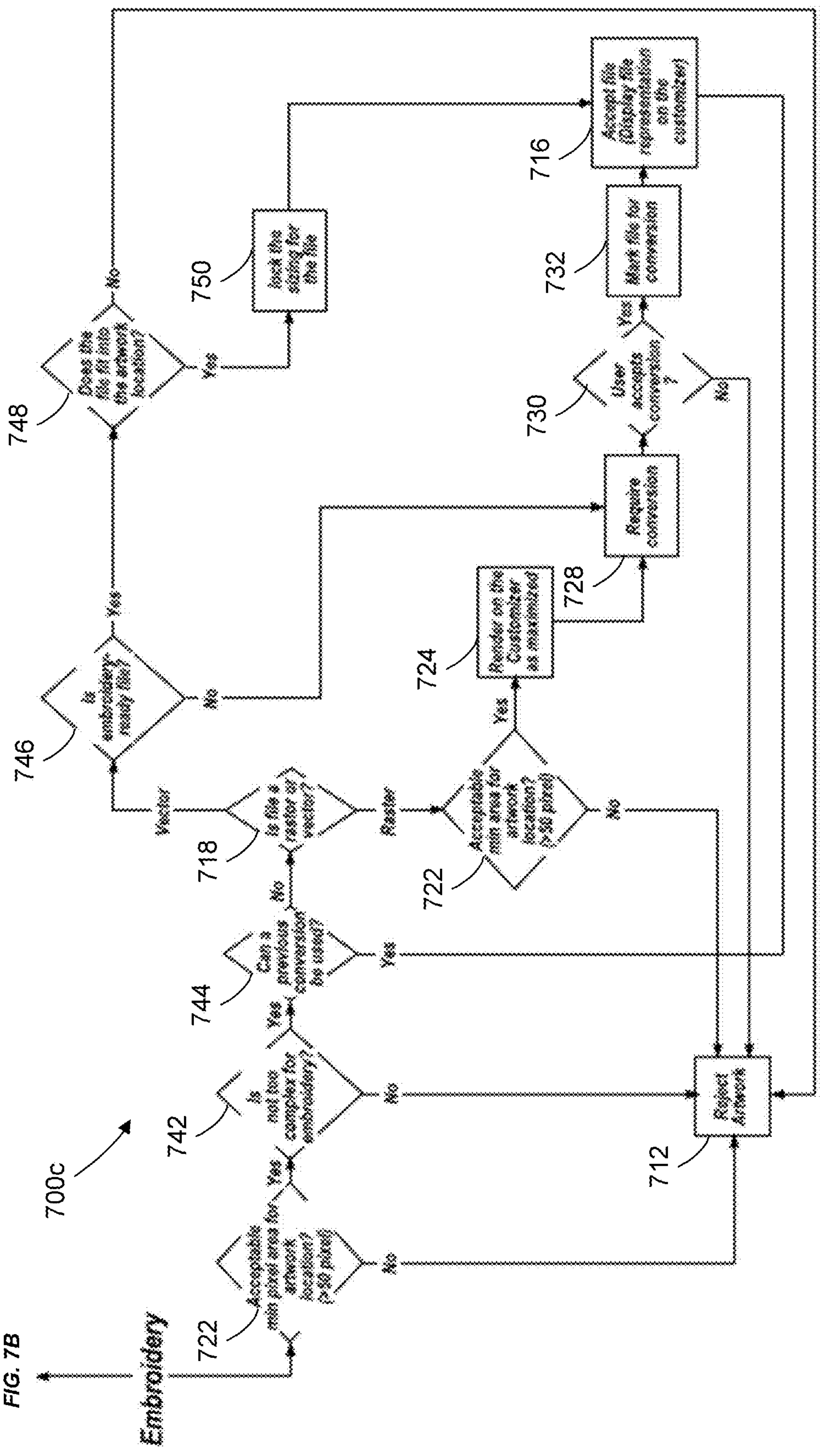

FIGS. 7A-7C show a flowchart of example processes for custom orders with direct-to-garment (DTG) printing on a garment 700*a*, screenprint on a garment 700*b*, and embroidery on a garment 700*c*. Much of the process is similar or the same for all types of manufacturing of the custom order although some aspects and/or steps differ slightly based on the type of selected manufacturing technique. The customers 702 upload artwork or select their artwork from a library stored in the memory of the end-to-end product customization system 704. The system then determines which type of garment decoration method is requested by the customer 704 and whether the artwork was selected from the existing library 706. If the artwork was selected from the existing library then the system determines if the file from the library was originally used for embroidery rather than DTG printing 708. If the artwork was not selected from the art library and/or if the file was not originally used for embroidery, then the system determine whether the file type is acceptable and if it is less than 15 Mb in size 710 in this example. If the artwork was previously used for embroidery, the file is instead rejected 712. Embroidery files, whether or not converted, are not compatible with DTG machines and cannot be converted to a DTG production-ready file. Instead, the order file would need to be converted to the DTG production-ready file type.

If the file type is acceptable and it is less than 15 Mb in size 710, then the system determines if a previous conversion of the file can be used 714. If a previous conversion can be used, then the file is accepted and a file representation, such as a pseudo image rendering described above, is displayed on a customizer, such as a customer dashboard 716. If the previous conversion of the file cannot be used, then the system determines if the file is a raster or vector file 718 in this example. If it is a vector file, the system then determines whether the vector file has an embedded raster file 720. If the system determines that the file is instead a raster file or if it determines that the vector file has an embedded raster file 720, it then determines whether the pixel area for the artwork is acceptable. In this example, the minimum pixel area 51 pixels. If the pixel area is not acceptable, the artwork is rejected 712. If the pixel area is acceptable, then the system renders the artwork on the customer as maximized 724 and accepts the file 716. If the vector file does not have a raster file embedded, then the system accepts the file 716.

FIG. 7B shows a similar example process for custom orders of screen printed garments. The process is nearly the same for screen printing as for DTG printing except the system determines if the color count exceeds a limit configured by the decorator producing the custom order 740 after the system determines the file type is acceptable and is less than 15 Mb in size. FIG. 7C shows an example process for custom orders of embroidered garments. Several steps are similar or the same as the steps for DTG and screen printing. However, for embroidery, the system determines whether the custom order is too complex for embroidery 742 after it determines that the artwork file has the acceptable minimum pixel area for the artwork 722. If the custom order is too complex for embroidery, the system rejects the artwork 712. If the system determines that the custom order is not too complex for embroidery, then the system determines whether a previous conversion file can be used 744. If the file is a vector file, the system determines whether the vector file is a embroidery-ready file 746. If not, the system requires file conversion 728. If the vector file is an embroidery ready file, then the system determines whether the file fits into the artwork location 748. If not, the system rejects the artwork 712. If the file fits into the artwork location 748, then the system locks the sizing for the file 750 and accepts the file for further processing.

If the system determines that a file requires conversion and that a previous conversion is not usable 726, then the system requires conversion of the artwork file 728. The user who is the customer in FIGS. 7A-7C, must accept the file conversion 730 to proceed in this example. If the user does not accept the conversion, then the artwork is rejected 712. If the user accepts the conversion, then the system marks the file for conversion 732 and accepts the file 716. If the system determines that a file requires conversion and that a previous conversion is usable, then the system will also accept the file 716. After the system accepts the DTG, screen printing or embroidery file, the system performs a final validation check 734 to determine if the file is a raster or vector file with an embedded raster file. If not, then the system accepts the file 716. If it is, then the system determines whether a previous file conversion can be used 726.

In some examples, the end-to-end product customization system includes a user interface, such as a display on a computing device like a personal computer, mobile device, tablet, or the like. The above-described alerts and prompts can be displayed on these displays of any user device. The users of the end-to-end product customization system include a consumer, customer/distributor, decorator, conversion house, logistics manager, or the like. In some examples, the end-to-end product customization system provides a dashboard for both the customer/distributor and the decorator, as shown in FIGS. 8A-9B. These dashboards are displayed through a device application or a web-based application. In other examples, a message—such as an electronic mail (e-mail) or a push notification is transmitted to the user device and either automatically displays or requires the user to select the message for display on the user device. Alternatively, the end-to-end product customization system links or allows existing or developed systems to interact through an application programming interface (API) that allows data sharing and transparency between entities along the product customization supply chain. Such an API model also allows end users to input or view data relating to the custom order, such as instructions relating to the custom order or progress reports on the status of the custom order.

Figure 8A:
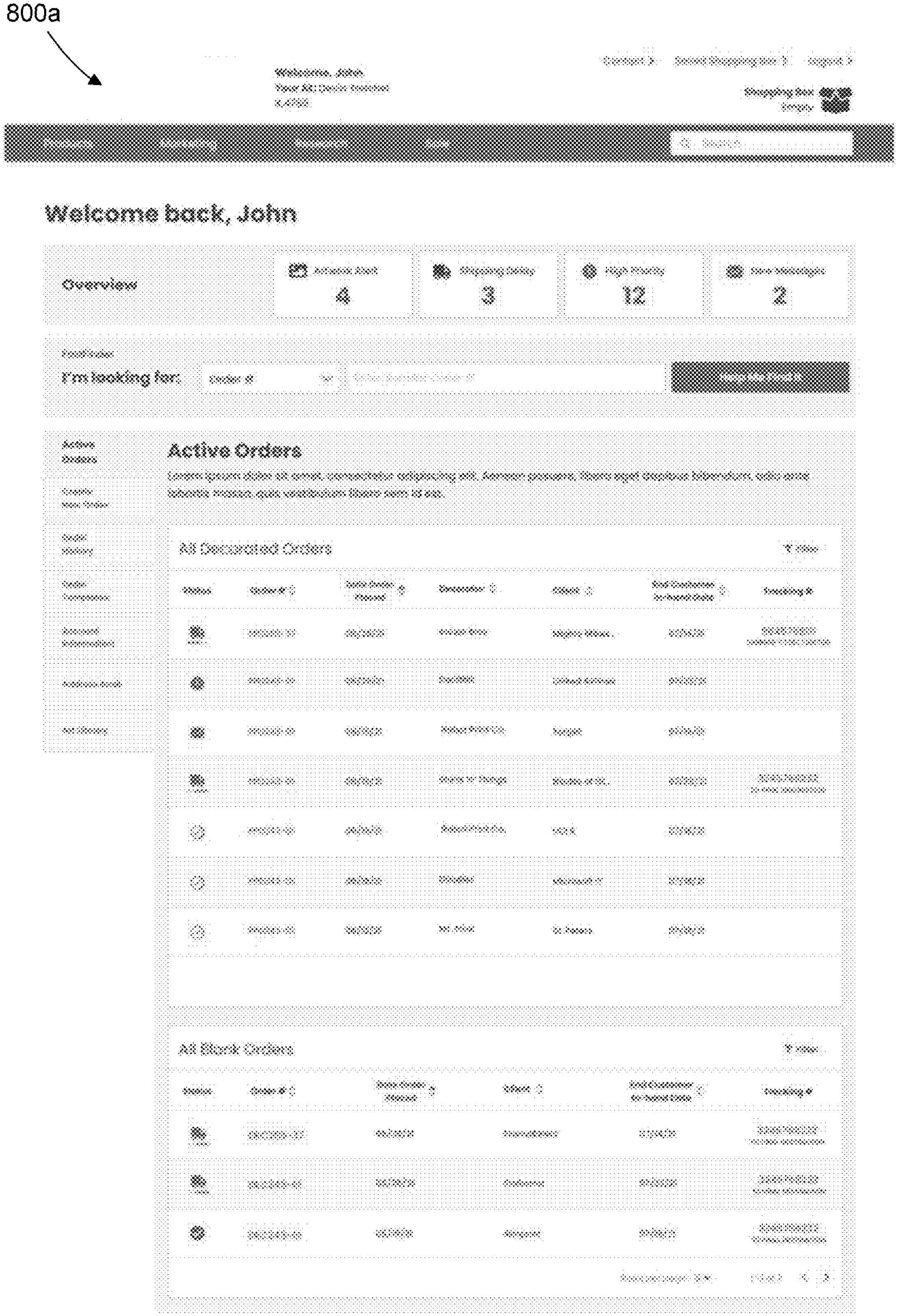
FIGS. 8A-8D show example user interface screens of a customer dashboard for the customer system/server/device shown in FIGS. 4A-4C.
Figure 8B:
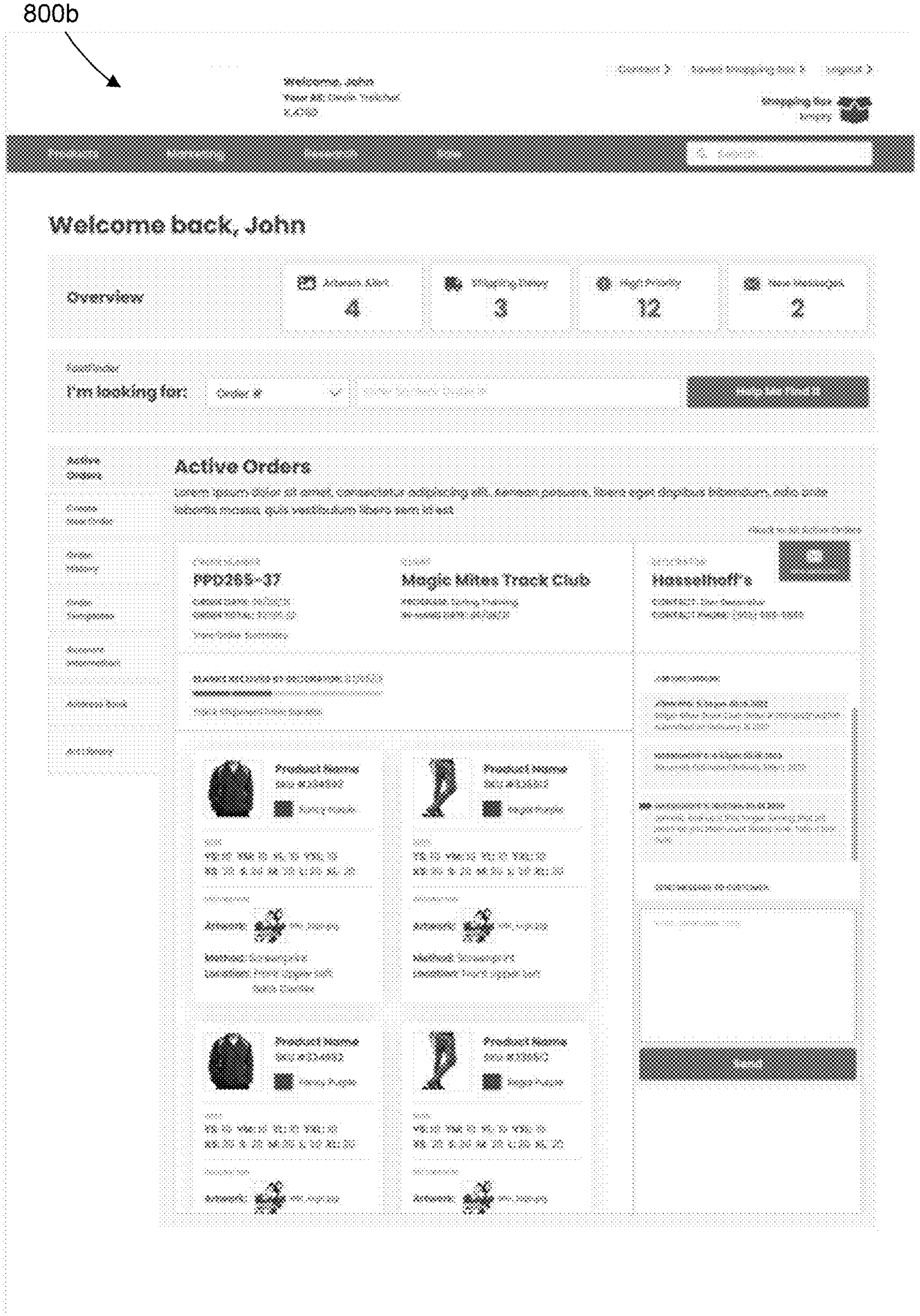
Figure 8C:
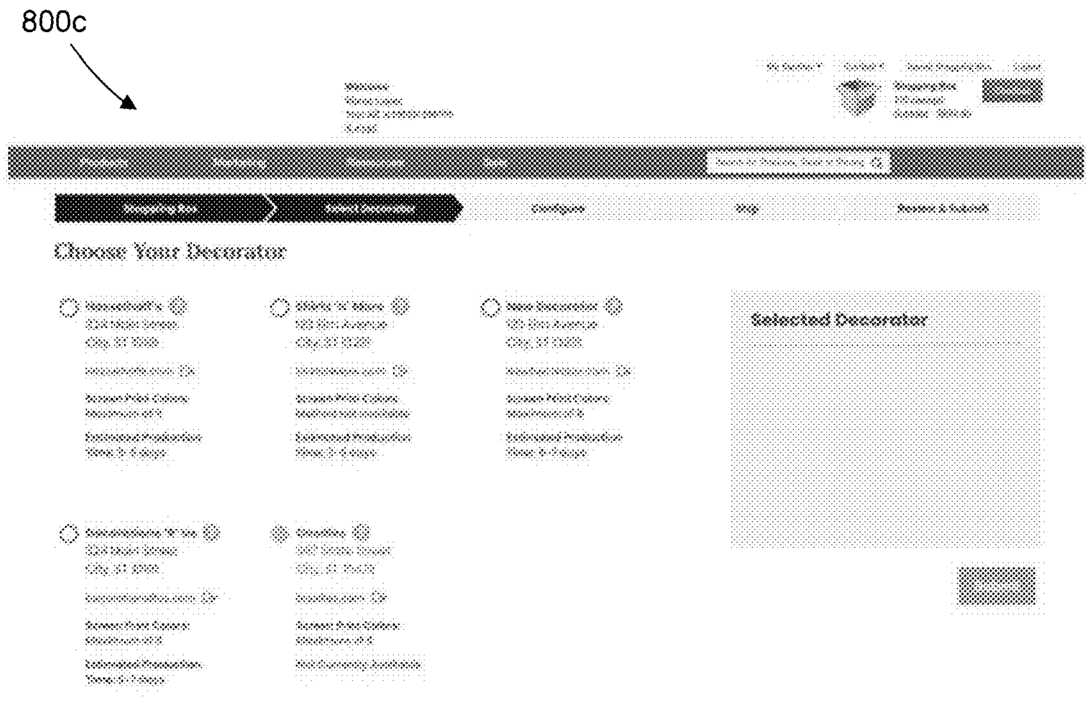
Figure 8D:
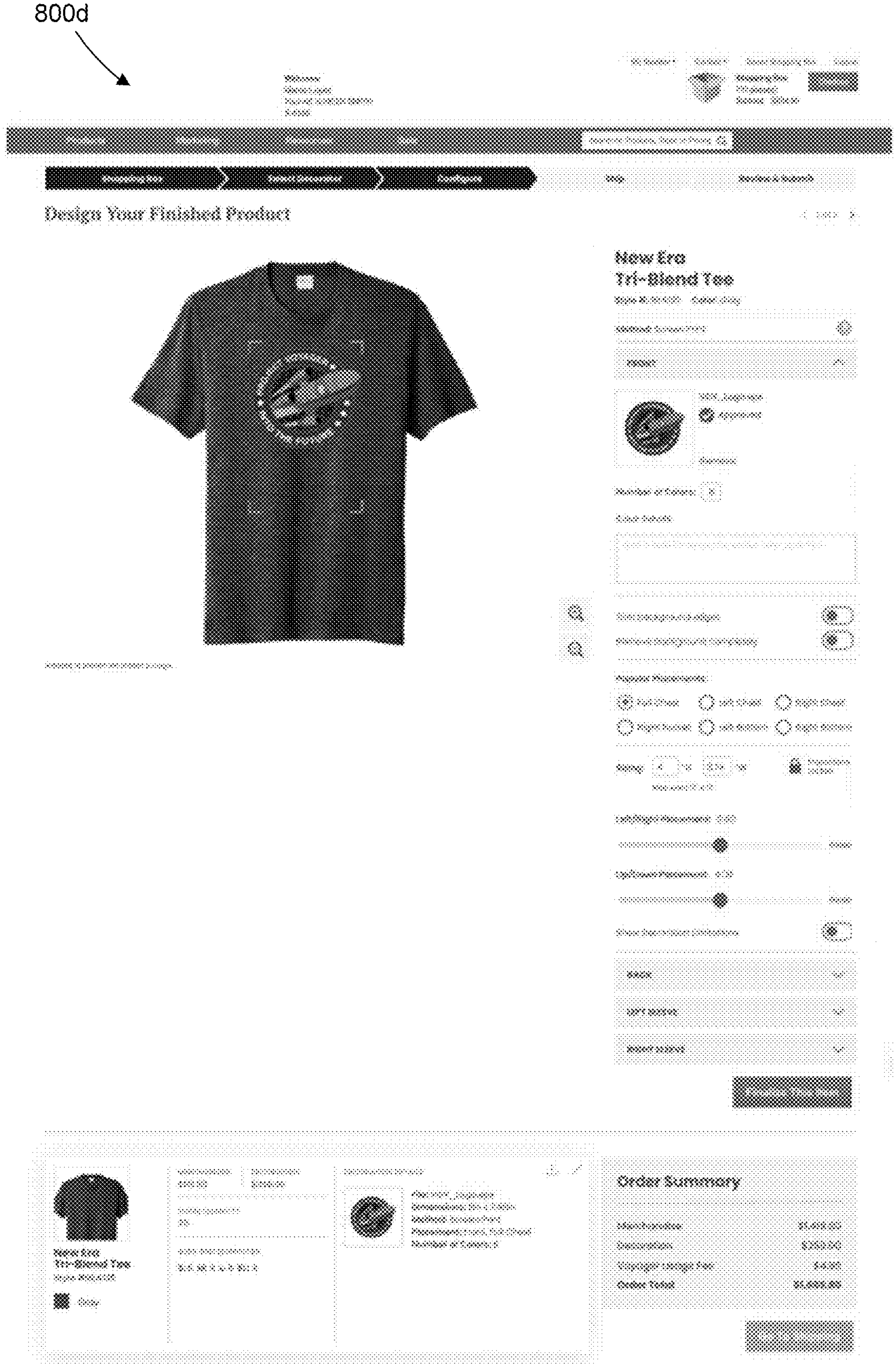

FIGS. 8A and 8B show a customer or distributer dashboard. FIG. 8A is the customer dashboard with the active orders 800*a* along with custom order data including the current status, order number, dated of order, decorator producing the order, a client name, and an estimated date of arrival along with tracking information if the order was already shipped. FIG. 8B shows the same customer dashboard for a specific customer order 800*b* that shows the order details of the garments ordered, the current status of the order progress, the decorator information along with a link to message the decorator directly regarding the order. FIG. 8C is another portion of the customer dashboard that shows a decorator selection option with updated information about the capabilities, capacity, and availability of matched decorators with the customer order 800*c*. FIG. 8D is yet another portion of the customer dashboard that is the pseudo image rendering or customizer that displays the artwork on the garment as it will be produced 800*d*

Figure 9A:
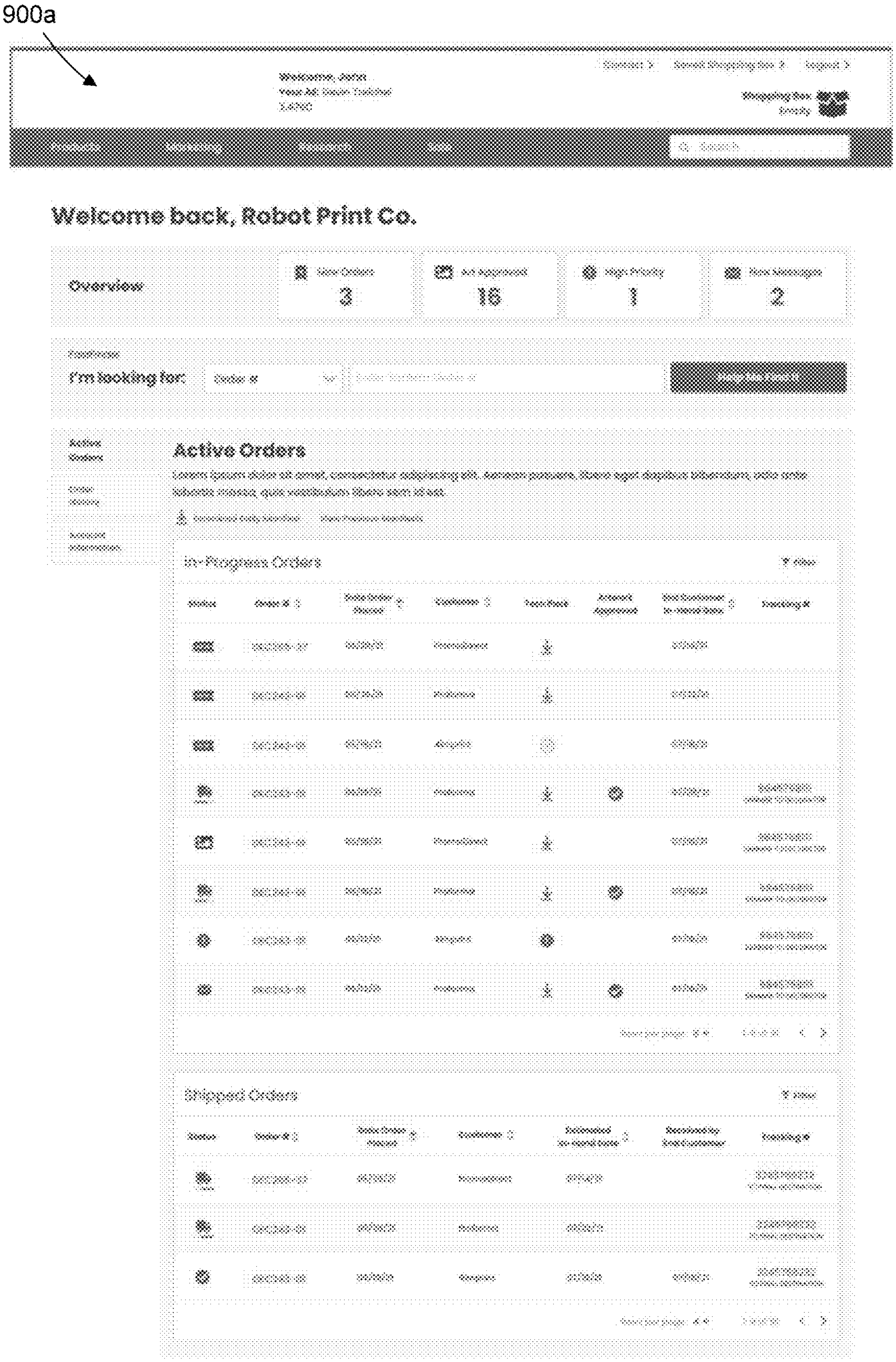
FIGS. 9A and 9B show example user interface screens of a decorator dashboard for the decorator system/server/device shown in FIGS. 4A-4C.
Figure 9B:
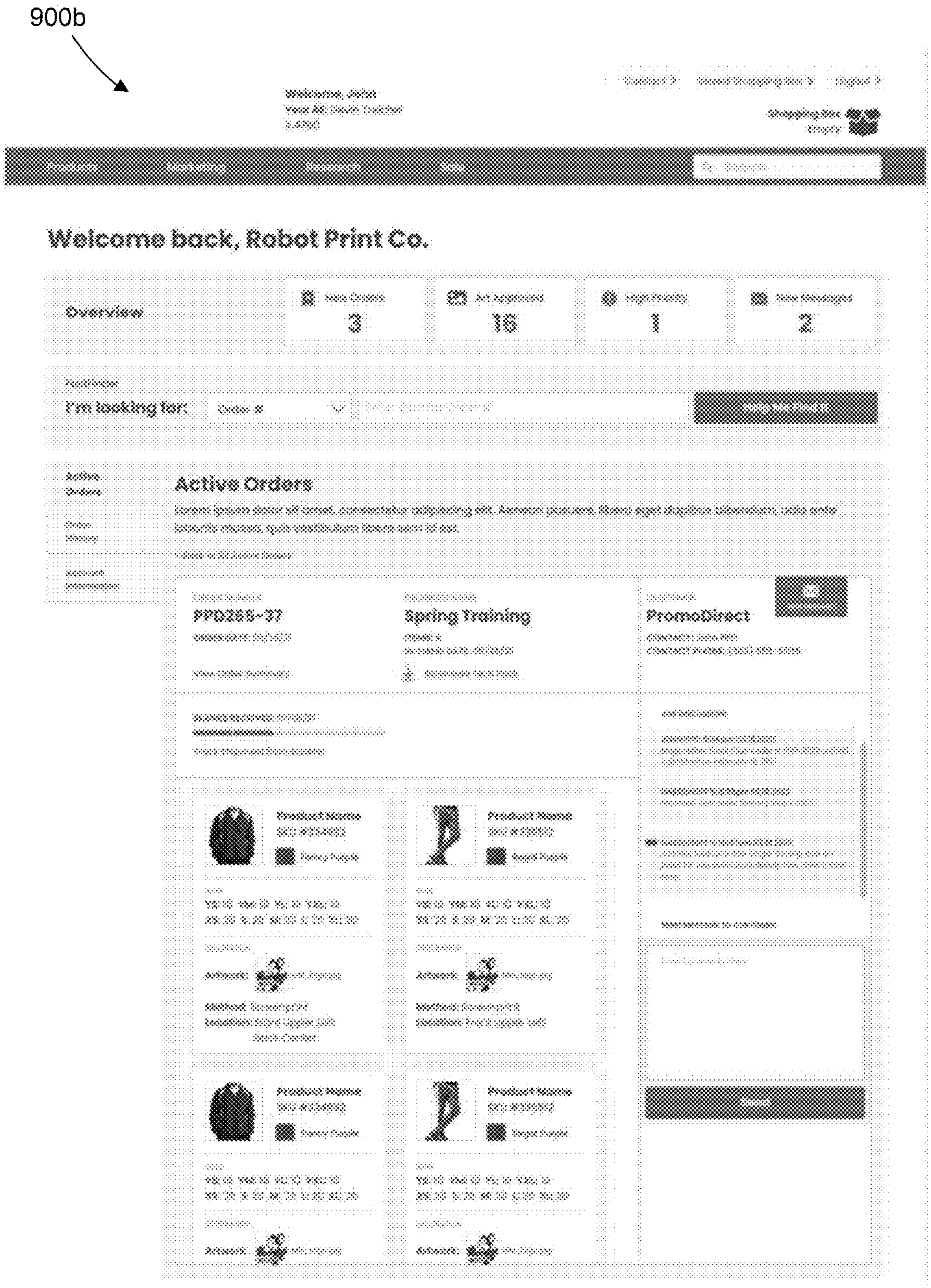

FIGS. 9A and 9B show a decorator dashboard. FIG. 9A shows the active orders for the decorator 900*a* with similar information to that of the customer dashboard. FIG. 9B shows a decorator dashboard 900*b* for a specific active order with similar information to that of the customer. The decorator dashboard for this custom order includes a link to directly message the customer, if needed.

Any of the individuals or entities that interact with the end-to-end product customization system can have a profile that includes data related to the individual or entity and/or data relating to the custom order, order history, decorator or manufacturer preferences, logistics details, and other data or preferences. The end-to-end product customization system can, in some examples, rely on a feature, characteristic, or element of the data in a profile of one individual or entity to match it with a feature, characteristic, or element of the data in a profile of another individual or entity in the supply chain to create the customized products. In some examples, the end-to-end product customization system can include an AI or ML model that predicts profile information related to any of the individuals or entities along the product customization supply chain to best match individuals or to predict availability and other custom order details. Alternatively, a matching algorithm can identify characteristics or features in a first profile, such as a customer/distributor, that match with characteristics in a second profile, such as a decorator. The match by the algorithm can be based on a set of rules that are unique to the matching algorithm or AI/ML model, and can be based on factors, such as order history, geographic location of a user, garment, user preferences, type of order, volume of order, a caliber or tier assigned to a user, and the like. The algorithm or AI/ML model can apply assumptions about the environment, the user involved, the order, or any other factors to match profiles. Such assumptions can include requested speed of order, geographic location of an entity in the supply chain, preferences of one or more entities involved in the supply chain, and the like.

For example, the customer is a distributor with a distributor profile. The distributor profile includes contact information, geographic location, order history, decorator preference, product preference, distributor artwork (stock or previously custom-designed artwork), and the like. Some example systems store the distributor's production ready artwork in the profile for access later by the distributor or any other user or entity. Multiple decorators also have respective decorator profiles in this example. Any suitable number of decorators are included in alternative examples, including a single decorator or as many decorators as are available or desired. In the example with multiple decorators, their respective decorator profiles include decorator contact information, geographic location, decorator industry specialties or expertise, custom product project history, distributor feedback, manufacturer feedback, distributor preference, product preference, manufacturer preference, and the like. The decorator profile can also include data relating to the decorator's availability to perform work on a custom order and decorator capabilities to perform certain work, which can be updated in real-time in some examples. The decorator's availability to perform work on the custom order can include lead times, expertise, known relationships with manufacturers, experience with certain custom features of a custom order (e.g., embroidery, fabric, textiles, team uniforms, hard goods, etc.), and the like. The decorator's capabilities can include data relating to the decorator's experience in general or with certain aspects of the custom order of the distributor. The end-to-end product customization system matches the distributor with one or more decorators available to help on the custom order based on data in the distributor profile and data in the decorator(s) profile(s).

For example, the distributor requires that a custom order is completed within a certain time period by a decorator that specializes in laser etching techniques to apply artwork to hard goods like coolers and drinkware. The distributor profile includes a geographic location and a preference to work with a list of five known decorators. The end-to-end product customization system evaluates the profiles of the five decorators to determine that three are available to complete a custom order with the time period required by the distributor and have the capabilities to ship the custom products to the distributor in a cost-efficient manner. Two of the three available decorators have a listed specialty of laser etching on hard goods in their respective decorator profiles.

The end-to-end product customization system optionally evaluates other known decorators that have laser-etching expertise on hard goods and are available to complete the custom order and ship it cost efficiently to the distributor within the desired time period. The end-to-end product customization system generates a user prompt to output or transmit to the distributor that includes two categories of decorators for the distributor's custom order. The first category includes those two decorators on the distributors preferred list that specialize in laser etching hard goods and are available to complete the custom order within the desired time period. The second category of decorators includes the additional decorators with laser etching expertise that are also available to complete the custom order within the desired time period but may not yet be on the distributor's preferred list. Optionally, the distributor can request or the end-to-end product customization system can automatically provide pricing information from each of the identified decorators to present to the distributor. The distributor then selects the desired decorator.

Still further, the end-to-end product customization system can apply an assumption to the ingested data for each profile to make a match recommendation. Assumptions can include feedback on or known previously tracked strengths of a decorator that are matched with feedback on or history of previously tracked behaviors of a customer/distributor. For example, three decorators are matched with a distributor to fulfill a custom order based on availability, customization capability, and geographic location. The end-to-end product customization system has also tracked feedback on past orders of the distributor and each of the three decorators and identified multiple past orders that were more than 3 days delayed on which the distributor gave negative feedback. One of the three decorators has a high rating for on-time delivery of custom order while the other two decorators previously had multiple orders delayed over 3 days. The end-to-end product customization system ranks the three available decorators with a "best match" identified for the decorator with the history of on time deliveries to the distributor with an optional explanation or recommendation output to the distributor.

The decorator, once selected by the distributor or offered in response to being on a "select" list of decorators being considered for a custom order (with or without a best match, ranking, etc.), evaluates the custom order for various quality control, timing, complexity, geographic location, file conversion requirements, order volume, and the like. The decorator(s) identify a change order that edits, amends, adds to, or otherwise alters the custom order. The decorator(s) send the change order to the end-to-end product customization system for analysis. In some cases, the change order adjusts a price that was previously assigned to the custom order. If the price changes, the end-to-end product customization system notifies the customer—in this case the distributor—of the pricing change, or alternatively could output an update to a display, such as a distributor and/or decorator dashboard. Optionally, the distributor also has the option to approve the pricing change or request a match with another decorator or manufacturer. In this case, the end-to-end product customization system produces an adjusted price for the production-ready custom order that would be sent to the decorator manufacturer to create the customized products.

In this example, the decorator evaluates the file type of the artwork being applied to the hard goods. The decorator's evaluation identifies a file conversion mismatch between the order file type and the manufacturer's file type for the equipment that laser etch hard goods. In this case, the decorator creates a conversion recommendation that requires that the file is converted from the order file type or a production-ready file type that aligns with the requirements of laser etching manufacturer's equipment. In some circumstances, the decorator does not have the expertise to perform the file conversion required to produce a production-ready file type for laser etching in which case the decorator engages or identifies that a conversion house must be engaged to complete the file conversion to the production-ready file. The decorator either alerts a conversion house directly and/or the end-to-end product customization system transmits this conversion recommendation to engage a conversion house. The end-to-end product customization system identifies one or more conversion houses with the capabilities to perform conversion of the provided custom order file type to the production-ready file type. The end-to-end product customization system sends the data relating to the identified conversion house(s) to the decorator and/or to the distributor and updates the pricing via an output alert and/or update on a dashboard available to any entity in the supply chain if the file conversion requires a price increase. In this example, the end-to-end product customization system determines the pricing based on both the customization option of laser etching hard goods and the conversion recommendation to engage a conversion house to convert the file to laser etching manufacturing requirements.

Based on the customization option, the end-to-end product customization system generates an image of the custom order for the distributor. For example, the end-to-end product customization system generates an order image correlating to a custom order that includes a request to apply an embroidered logo to a jacket. The image can, in some examples, be added to an image of the jacket worn by a human, virtual, or avatar model. As described above, the order image is a prediction of a modified image of the human, virtual, or avatar model wearing the jacket with the applied artwork. This prediction is based on the decorator's evaluation of the customization option. The end-to-end product customization system includes the change orders to the prediction of the modified image. In this example, suggested color count change or increased stitch count for the embroidery is displayed on a jacket worn by a virtual human model.

Alternatively, the products can be virtually modeled in another manner, such as by displaying the mapped product with the applied customization without a virtual or human model or displayed in any other suitable way.

In some examples, the end-to-end product customization system includes a mapped version of the jacket or other customized product to a displayed human or virtual model or an avatar, as described above. Optionally, multiple garments available for customization can be mapped to virtual or human models for display with the custom artwork or other customization option. The order image helps the end user envision the customized product as a supplement or a substitute to order a proof of the customized product. Ordering proofs of custom products for inspection or quality verification requires substantial amounts of time and increased cost. Visually displaying the selected customized products for the distributor increases efficiency and lowers the cost of the custom order process.

The mapping of the product—whether displayed as a standalone product without a model or displayed with a human or virtual model—applies the artwork or customization to the product in an accurate location. Mapping is the process of taking set points or known dimensions of a customization to match or align them with corresponding set points or known dimensions on the product. For example, artwork is mapped to a jacket by creating various data points on the artwork and the jacket to place it in the desired location on the jacket as if the jacket were created with the applied artwork. In contrast, as described above, conventional systems merely overlay the artwork file onto the jacket independently of each other without alignment or set points to correlate the artwork to the jacket. Such mapping dynamically improves accuracy of the finished custom product throughout the design process.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. The systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

What is claimed is:

1. A method of customizing a product, comprising:

training an artificial intelligence (AI) model based on known files that require changes for a customization option due to a quality mismatch, wherein the training is based on known files that include order history, geographic location of a user, garment, user preferences, type of order, volume of order, a caliber, or a tier assigned to a user;

receiving a request for a customer submitted custom order that includes a customization option to add artwork to the product and an order file type of the artwork to add to the product, wherein the artwork is virtually attached at multiple anchor points on the product to create a life-like pseudo image rendering of the artwork applied to the product;

outputting the pseudo image rendering;

identifying, using the AI model, a machine type that is required to apply the artwork to the product, the identified machine type based on a feature in data associated with one or both of the customization option and the order file type of the artwork;

evaluating, using the AI model, the customization option and the order file type of the artwork based on their respective compatibility, either alone or in combination, with the identified machine type;

determining, using the AI model, if any changes or conversion of the order file type of the artwork are needed to allow the identified machine type to add the customization option to the product based on whether the customization option and the order file type of the artwork are compatible with the identified machine type, wherein the AI model predicts profile information related to any of individuals or entities along a product customization supply chain to best match the individuals or to predict availability or other custom order details;

generating a change order that includes a change to the order file type of the artwork, the change order based on the determined changes or conversion of the order file type of the artwork that are needed to allow the customization option to be added to the product using the identified machine type;

receiving customer approval input to approve the change order;

converting the order file type of the artwork to a production-ready file type, the production-ready file type including machine instructions on how to apply the artwork to the product that are specific to the identified machine type that is required to decorate the product in the customer submitted custom order;

receiving the request for the custom order from a customer device and receiving the evaluation of the customization option from a central platform;

matching the customer to a decorator based on one or more of a customer characteristic, profile, or feature of the customer submitted custom order matching a decorator characteristic of the decorator, wherein the decorator characteristic includes decorator availability or design capability;

generating a production-ready custom order that includes the production-ready file type and is based on the change order and the conversion recommendation;

outputting the production-ready custom order to the matched decorator; and outputting the production-ready custom order to the user.

2. The method of claim 1, wherein the request for the customer submitted custom order includes a customization option that includes artwork to be applied to a garment.

3. The method of claim 1, further comprising transmitting the production-ready custom order to a decorator device, and receiving a secondary conversion recommendation from one or both of a decorator or a conversion house.

4. The method of claim 1, wherein the evaluation of the customization option includes image analysis, stitch count rating, and color analysis.

5. The method of claim 4, further comprising:

generating the life-like pseudo image rendering based on the evaluation of the customization option.

6. The method of claim 5, wherein the life-like pseudo image rendering is based on a physical characteristic of the customization option.

7. The method of claim 5, further comprising:

outputting a customer prompt to approve the life-like pseudo image rendering; and upon receipt of a customer response approving the life-like pseudo image rendering, proceeding to convert the order file type to the production-ready file type that includes manufacturing and color instructions for the customization option of the custom order.

8. The method of claim 5, wherein the customer submitted custom order that includes the customization option includes a garment with applied custom artwork, and further comprising generating the life-like pseudo image rendering with the applied custom artwork on the garment worn by a virtual model or on a standalone garment displayed without a model.

9. The method of claim 1, further comprising:

determining a price for the production-ready custom order; and outputting the price.

10. The method of claim 9, further comprising determining the price for the production-ready custom order based on the evaluation of the customization option and the change order.

11. The method of claim 1, further comprising outputting the production ready custom order to the customer, and receiving customer input approving the production-ready custom order.

12. The method of claim 11, further comprising generating an instruction to start production of the production-ready custom order.

13. The method of claim 11, further comprising receiving a progress alert regarding the production-ready custom order.

14. The method of claim 13, further comprising displaying the progress alert regarding the production-ready custom order on one or both of a customer device dashboard and a decorator device dashboard.

15. The method of claim 13, further comprising receiving a completed order alert that the production-ready custom order is partially complete or fully complete.

16. The method of claim 15, further comprising requesting an audit of a unit of the partially completed production-ready order or the fully completed production-ready order.

17. The method of claim 1, further comprising:

comparing the production-ready file type to a universal manufacturing file type; and converting or outputting a request to convert the production-ready file type to the universal manufacturing file type.

18. The method of claim 1, further comprising:

determining that the production-ready file type matches characteristics of a manufacturing file type; and converting the production-ready file type to the manufacturing file type.

19. The method of claim 1, further comprising outputting the production-ready custom order to a decorator device or server.

20. The method of claim 1, further comprising out-putting the production-ready custom order to a decorator device and receiving a response that includes an approval of the production-ready custom order.

21. The method of claim 1, further comprising the production-ready custom order to a decorator device and receiving a response that includes a rejection of the production-ready custom order with requested changes to the production-ready file type.

22. The method of claim 21, further comprising receiving secondary approval input from the customer device to approve the requested changes to the production-ready file type in the response from the decorator device.

23. The method of claim 22, further comprising re-converting the order file type of the artwork to a re-converted production-ready file type, generating the production-ready custom order to also include the re-converted production-ready file type of the artwork, and outputting the production-ready custom order that includes the re-converted production-ready file type.

24. The method of claim 1, further comprising receiving a customer submitted instruction to manipulate an aspect or feature of the customization option, and generating the production-ready custom order that includes the manipulated aspect or feature of the customization option and the production-ready file type.

25. The method of claim 1, wherein the product is apparel, textiles, or hard goods.

* * * * *